(12) United States Patent
Loitesberger et al.

(10) Patent No.: US 12,098,709 B2
(45) Date of Patent: Sep. 24, 2024

(54) METHOD FOR ASSEMBLING A ROTOR BEARING OF A WIND TURBINE

(71) Applicant: Miba Gleitlager Austria GmbH, Laakirchen (AT)

(72) Inventors: Alexander Loitesberger, Ohlsdorf (AT); Albert Waldl, Laakirchen (AT); Patrick Laubichler, Gmunden (AT)

(73) Assignee: Miba Gleitlager Austria GmbH, Laakirchen (AT)

( * ) Notice: Subject to any disclaimer, the term of this patent is extended or adjusted under 35 U.S.C. 154(b) by 0 days.

(21) Appl. No.: 18/039,001

(22) PCT Filed: Aug. 30, 2021

(86) PCT No.: PCT/AT2021/060301
§ 371 (c)(1),
(2) Date: May 26, 2023

(87) PCT Pub. No.: WO2022/109635
PCT Pub. Date: Jun. 2, 2022

(65) Prior Publication Data
US 2023/0417224 A1    Dec. 28, 2023

(30) Foreign Application Priority Data

Nov. 30, 2020   (AT) .............................. A 51044/2020
Apr. 8, 2021    (AT) .............................. A 50259/2021
Apr. 8, 2021    (AT) .............................. A 50261/2021

(51) Int. Cl.
*B23P 15/00*    (2006.01)
*F03D 1/06*     (2006.01)
(Continued)

(52) U.S. Cl.
CPC ............ *F03D 80/703* (2023.08); *B23P 15/00* (2013.01); *F03D 1/0691* (2013.01);
(Continued)

(58) Field of Classification Search
CPC ........................... B23P 15/00; Y10T 29/4932
See application file for complete search history.

(56) References Cited

U.S. PATENT DOCUMENTS 2,480,114 A    8/1949  Bradbury
4,105,261 A    8/1978  Myers et al.
(Continued)

FOREIGN PATENT DOCUMENTS

AT        16 129 U1     2/2019
CN      209855967 U    12/2019
(Continued)

OTHER PUBLICATIONS

English Machine Translation of DE-102020108248-B3 (Year: 2021).*
International Search Report in PCT/AT2021/060301, mailed Feb. 10, 2022.

*Primary Examiner* — Sarang Afzali
(74) *Attorney, Agent, or Firm* — Collard & Roe, P.C.

(57) ABSTRACT

In accordance with a method for assembling a rotor bearing arrangement of a wind turbine, individual slide bearing pads are inserted in the bearing block. The bearing block fitted with the slide bearing pads is then joined to a rotor block. During the joining of the rotor shaft and of the bearing block fitted with the slide bearing pads, the rotor shaft may be installed on a rotor shaft support so as to be vertically upright. A rotor shaft flange of the rotor shaft may rest on the rotor shaft support. The bearing block fitted with the slide bearing pads may be placed upon the rotor shaft vertically from above.

10 Claims, 24 Drawing Sheets

Figure 1:
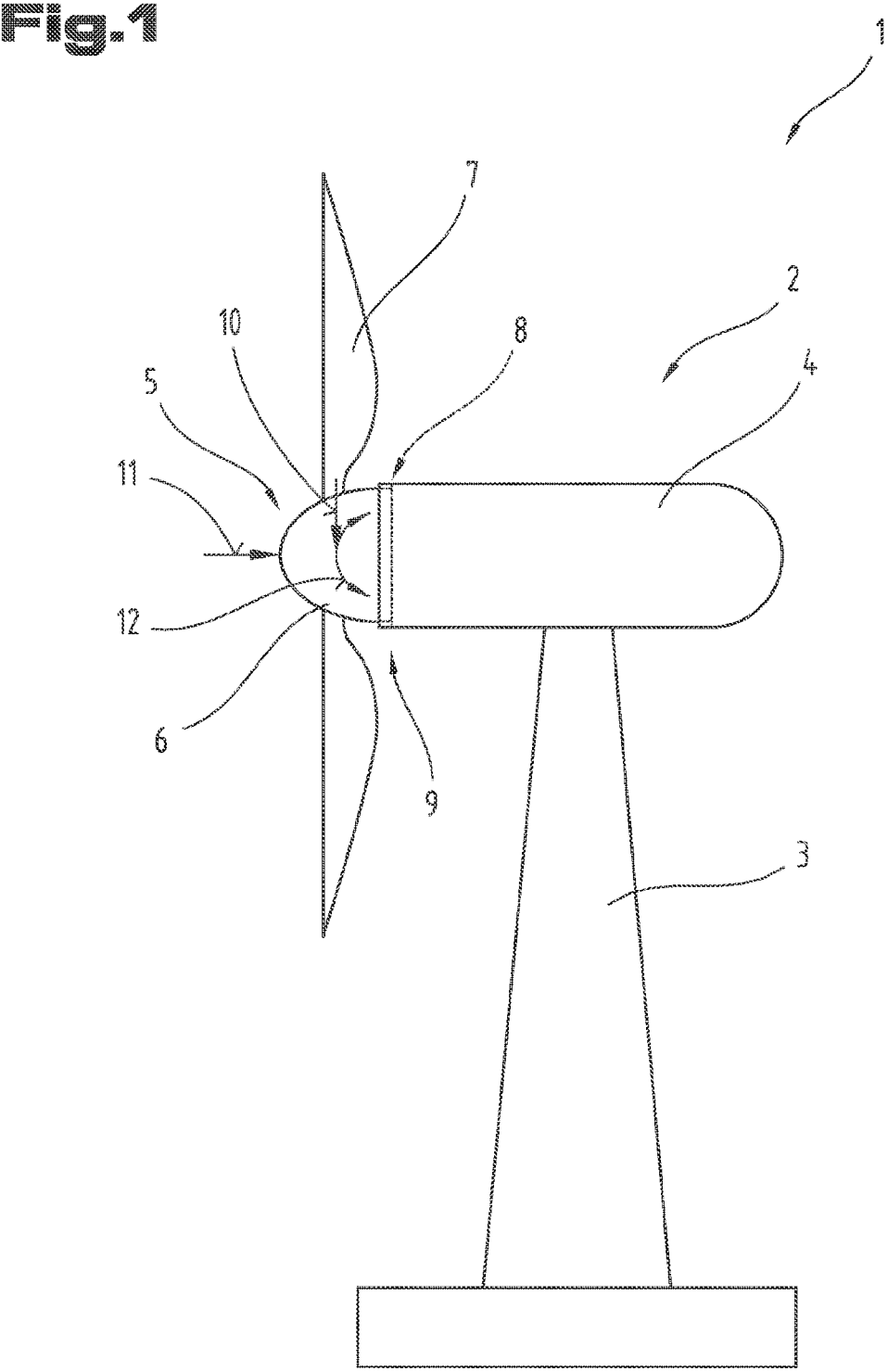

(51) Int. Cl.
    *F03D 13/10*        (2016.01)
    *F03D 80/70*        (2016.01)
    *F16C 17/02*        (2006.01)
    *F16C 17/10*        (2006.01)
    *F16C 35/02*        (2006.01)
    *F16C 41/04*        (2006.01)
    *F16C 43/02*        (2006.01)
(52) U.S. Cl.
    CPC ............ *F03D 13/104* (2023.08); *F16C 17/02* (2013.01); *F16C 17/10* (2013.01); *F16C 35/02* (2013.01); *F16C 41/04* (2013.01); *F16C 43/02* (2013.01); *Y10T 29/4932* (2015.01)

(56) References Cited

U.S. PATENT DOCUMENTS

| | | | |
|---|---|---|---|
| 8,974,120 B2* | 3/2015 | Pedersen | F03D 80/70 384/302 |
| 9,458,880 B2 | 10/2016 | Kari et al. | |
| 11,421,658 B2 | 8/2022 | Ben Haddou et al. | |
| 2014/0373353 A1* | 12/2014 | Westergaard | F03D 80/70 29/889 |
| 2019/0234457 A1* | 8/2019 | Hoelzl | F03D 80/70 |
| 2019/0368544 A1 | 12/2019 | Julliand et al. | |
| 2022/0154773 A1 | 5/2022 | Purucker | |

FOREIGN PATENT DOCUMENTS

| | | | |
|---|---|---|---|
| DE | 200 22 490 U1 | 1/2002 | |
| DE | 10 2013 225 314 A1 | 6/2015 | |
| DE | 10 2018 215 402 A1 | 3/2020 | |
| DE | 102020108248 B3 * | 6/2021 | ............ F03D 80/50 |
| EP | 2 434 141 A1 | 3/2012 | |
| EP | 2 754 893 A1 | 7/2014 | |
| EP | 2 816 224 A1 | 12/2014 | |
| EP | 3 260 715 A1 | 12/2017 | |
| EP | 3 460 269 A1 | 3/2019 | |
| EP | 3 633 190 A1 | 4/2020 | |
| EP | 3 739 227 A1 | 11/2020 | |
| WO | 2011/127510 A1 | 10/2011 | |
| WO | 2020/169762 A1 | 8/2020 | |

* cited by examiner

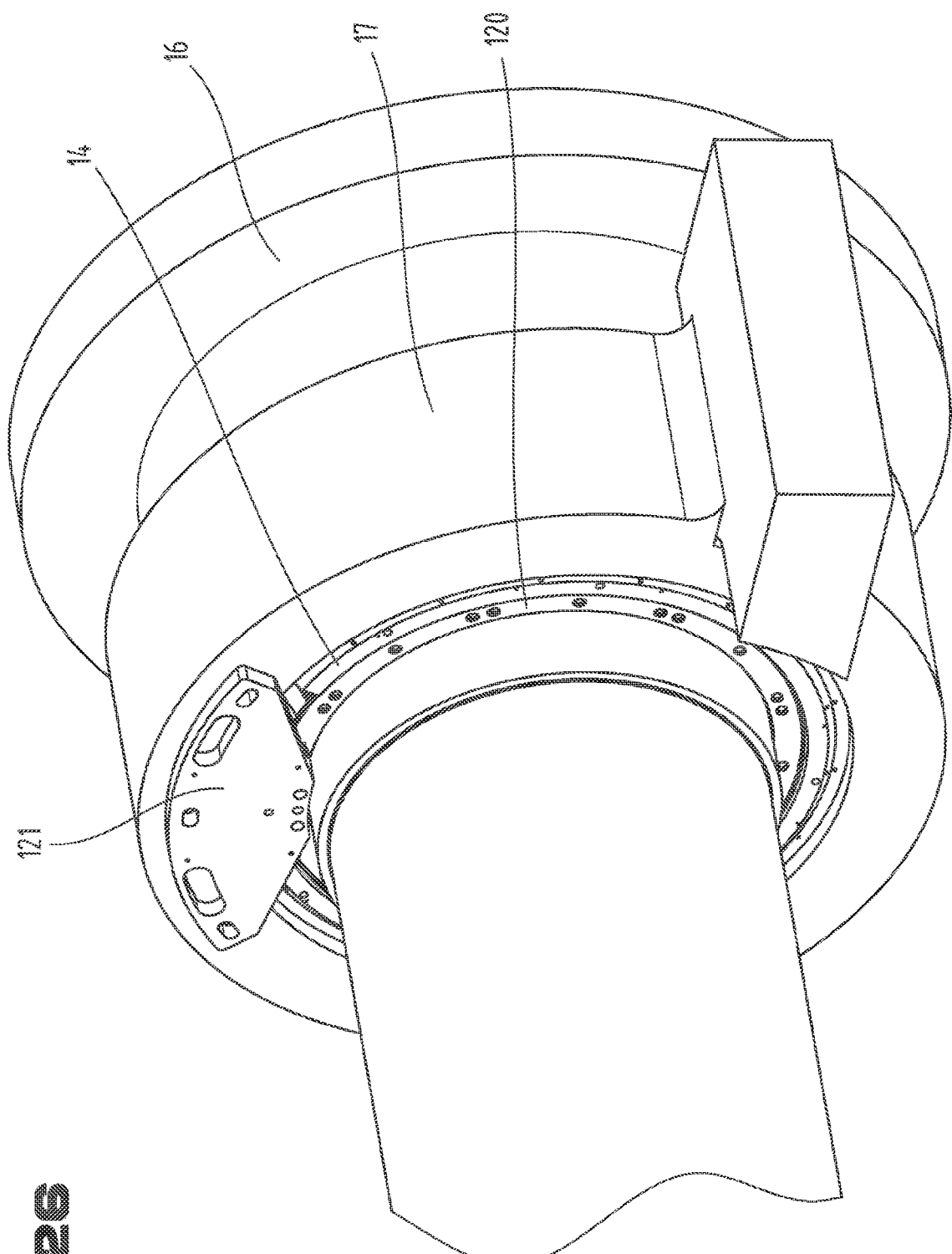

METHOD FOR ASSEMBLING A ROTOR BEARING OF A WIND TURBINE

CROSS REFERENCE TO RELATED APPLICATIONS

This application is the National Stage of PCT/AT2021/060301 filed on Aug. 30, 2021, which claims priority under 35 U.S.C. § 119 of Austrian Application No. A51044/2020 filed on Nov. 30, 2020, Austrian Application No. A50259/2021 filed on Apr. 8, 2021, and Austrian Application No. A50261/2021 filed on Apr. 8, 2021, the disclosures of which are incorporated by reference. The international application under PCT article 21(2) was not published in English.

The invention relates to a method and to an assembling device for assembling a rotor bearing arrangement.

A bearing element for mounting the rotor hub of a wind turbine is known from WO 2011/127510 A1.

Such bearing arrangements, as they are known from WO 2011/127510 A1, can be assembled only with difficulty.

It was the object of the present invention to overcome the disadvantages of the prior art and to make available a method and a device by means of which a simplified assembly of the rotor bearing arrangement is possible.

This object is achieved by means of a device and a method in accordance with the claims.

In accordance with the invention, a method for assembling a rotor bearing arrangement of a wind turbine is provided. The method comprises the method steps:
provisioning a rotor shaft;
provisioning a bearing block;
provisioning individual slide bearing pads;
inserting the slide bearing pads in the bearing block;
jointing the rotor shaft and the bearing block fitted with the slide bearing pads.

The method in accordance with the invention results in the advantage that the assembly of the rotor bearing arrangement is simplified through the method steps described. This enables the rotor bearing arrangement assembled according to the method to have an improved quality.

It may further be expedient if, during the jointing of the rotor shaft and of the bearing block fitted with the slide bearing pads, the rotor shaft is installed on a rotor shaft support so as to be vertically upright, wherein a rotor shaft flange of the rotor shaft rests on the rotor shaft support, and that the bearing block fitted with the slide bearing pads is placed upon the rotor shaft vertically from above. This results in the advantage that this measure enables a simple joining a simple connection between the rotor shaft and the bearing block. Vertically upright in accordance with this document means that the axis of rotation of the rotor shaft is aligned vertically.

It can further be provided that the bearing block is received on a receiving carriage of a receiving device and is guided by means of this receiving carriage, wherein the receiving carriage is received on the receiving device by means of a linear guide so as to be displaceable in a vertical direction. This results in the advantage that the bearing block can be slipped onto the rotor shaft by means of the receiving carriage without the risk of a tilting. In particular, the bearing block can be firmly received on the receiving carriage, wherein fastening recesses of the bearing block can serve to produce a connection with the receiving carriage here.

Furthermore, it can be provided that, prior to the jointing of the rotor shaft and of the bearing block fitted with the slide bearing pads, an axial stop ring is slipped onto the rotor shaft, wherein the axial stop ring serves to produce a contact with the slide bearing pads. This results in the advantage that the axial stop ring can serve to subsequently affix the slide bearing pads. In particular, it can be provided here that the axial stop ring, in the assembled state, forms an interlocking bond with the slide bearing pads.

In an alternative embodiment variant, it can be provided that, prior to the jointing of the rotor shaft and of the bearing block fitted with the slide bearing pads, a slide bearing pad reception ring is received on, in particular shrunk onto, the rotor shaft, wherein the slide bearing pad reception ring serves to affix the slide bearing pads. Particularly for rotor shafts, this is a highly sustainable and feasible bond. In the shrinking-on process, the slide bearing pad reception ring is heated and/or the rotor shaft is cooled down in order to facilitate an axial forcing-on. After the temperature equalization, and therefore the equalization of the respective thermal expansions, a tight fit of the slide bearing pad reception ring on the rotor shaft can be achieved.

Also advantageous is an embodiment in accordance with which it can be provided that, prior to the jointing of the rotor shaft and of the bearing block fitted with the slide bearing pads, a rotor shaft protection in the form of a sleeve is arranged on the rotor shaft, wherein the rotor shaft protection covers the parts of the rotor shaft over which the bearing block fitted with the slide bearing pads is moved during transfer to the seat of the slide bearing pads. This results in the advantage that the rotor shaft is protected by the rotor shaft protection during the jointing of the bearing block with the rotor shaft, so that the rotor shaft is not damaged by the bearing block. In particular, it can be provided that the rotor shaft protection is configured in the form of a plastic tube.

Further, it is also conceivable that the rotor shaft protection is configured in multiple pieces. In particular, it can be provided here that the rotor shaft protection has a first part, which has a centering circumference on its circumference. Further, the rotor shaft protection can have a second part, which rests against the first part and has an inner shoulder, which corresponds with the centering circumference of the first part. Furthermore, it can be provided that the rotor shaft protection has a third part, which equally has a centering circumference on its circumference and is partially plugged into the second part of the rotor shaft protection and/or interacts with same. It can further be provided that the rotor shaft protection, in particular the third part of the rotor shaft protection, has an insertion chamfer. This can serve to enable the bearing block to be displaced across the rotor shaft in a simple manner.

In accordance with one advancement, it is possible that, when inserting the slide bearing pads in the bearing block, the slide bearing pads are individually placed in the bearing block by means of a lifting device, wherein the slide bearing pads have a reception on their inner face for connecting the slide bearing pads with the lifting device. This results in the advantage that this measure enables the individual slide bearing pads to be inserted in the bearing block in a simple manner. The use of a lifting device can furthermore relieve the maintenance staff, whereby occupational health and safety can be improved. The reception for connecting the slide bearing pads with the lifting device enables the slide bearing pads to be gripped ergonomically, whereby a simple jointing of the individual slide bearing pads with the bearing block is enabled.

In a first embodiment variant, it is conceivable that an outer ring element is arranged in the bearing block, which outer ring element has a mating surface, which serves to be in contact with the bearing surface of the slide bearing pads during operation. In another exemplary embodiment, it is also conceivable that the mating surface is configured directly in the bearing block and the individual slide bearing pads are inserted directly in the bearing block.

It can further be expedient if, when inserting the slide bearing pads in the bearing block, at least individual of the slide bearing pads are moved radially outward in order to bring them into contact with a mating surface. This results in the advantage that slide bearing pads which have a sliding surface in the form of a spherical cap segment can be inserted in the bearing block in a simple manner. The radial movement of the individual slide bearing pads enables these to be inserted in the bearing block in a simple manner in an axial direction, wherein the individual slide bearing pads are inserted in the slide bearing block so as to be displaced in a direction towards the center, and subsequently the respective slide bearing pad is pushed radially outward, so that the slide bearing pad is displaced to its final position.

Further, it is also conceivable that, to insert the individual slide bearing pads in the bearing block, the bearing block is rested on the ground, or is received on a device, such that an axis of rotation of the bearing block is arranged vertically. This results in the advantage that this measure enables the individual slide bearing pads to be inserted in the bearing block in a simple manner.

In particular, it is conceivable here that the lifting device is coupled with a crane by means of a traction means.

Furthermore, it can be provided that, each time after placing one of the slide bearing pads in the bearing block, this slide bearing pad just placed in the bearing block is affixed to the bearing block by means of a connector. This results in the advantage that the individual slide bearing pads inserted in the bearing block can be protected against dropping out of the bearing block.

It can further be provided that the last of the slide bearing pads which is placed in the bearing block is inserted in the bearing block in an axial direction through a removal opening. This may become necessary if, due to the geometry of the individual slide bearing pads, a radially outward displacing of the last slide bearing pad is not possible, but that this last slide bearing pad must be slid to its position axially. Here, the removal opening can be configured either directly in the bearing block or in an outer ring element received in the bearing block, as the case may be. In particular, it can be provided that the removal opening is configured such that a spherical-cap-shaped mating surface is interrupted by the removal opening.

In accordance with one particular embodiment, it is possible that, after the jointing of the rotor shaft and of the bearing block fitted with the slide bearing pads, the individual connectors are removed, and the individual slide bearing pads are subsequently affixed to the rotor shaft. This results in the advantage that the individual slide bearing pads can be fixed on the rotor shaft through this measure and can therefore be twisted, together with the rotor shaft, relative to the bearing block during operation.

In an alternative embodiment variant, it can be provided that, after the jointing of the rotor shaft and of the bearing block fitted with the slide bearing pads, the individual connectors are removed, and the individual slide bearing pads are subsequently affixed to the slide bearing pad reception ring.

In accordance with one advantageous advancement, it can be provided that the assembly of the rotor bearing arrangement is done remote from a nacelle of a wind turbine and that, in a subsequent method step, the readily assembled rotor bearing arrangement is lifted onto the nacelle of the wind turbine by means of a crane and is affixed to the nacelle of the wind turbine. This results in the advantage that the assembly of the rotor bearing arrangement can be done in an environment specially equipped for this purpose, such as a machine hall, or also in a mounting tent, for example, which is arranged in a wind farm. Therefore, the assembly of the rotor bearing arrangement can be done in shielded environmental conditions. Furthermore, this measure enables the rotor bearing arrangement to be assembled in a simplified manner, as the assembly need not be done inside the nacelle of the wind turbine.

The invention relates furthermore to an assembling device for assembling a rotor bearing arrangement of a wind turbine, in particular for carrying out the method described above. The assembling device comprises a receiving device with a receiving carriage for receiving a bearing block fitted with the slide bearing pads, wherein the receiving device comprises a base frame and wherein the receiving carriage is coupled with the base frame by means of a linear guide.

The assembling device in accordance with the invention enables the assembly of the rotor bearing arrangement to be simplified.

It can further be provided that the linear guide is aligned vertically, so that the receiving device is displaceable in a vertical direction. This results in the advantage that the bearing block can be slipped onto the rotor shaft in a simple manner.

Furthermore, it can be provided that a rotor shaft support is configured, on which a rotor shaft can be installed, in particular that the rotor shaft support is displaceable relative to the receiving device in a horizontal direction. This results in the advantage that the rotor shaft support can serve to receive the rotor shaft in a precise alignment. A displaceability of the rotor shaft support enables the rotor shaft to be displaced during the jointing with the bearing block, so that a central alignment of the rotor shaft in the bearing block is enabled.

Also advantageous is an embodiment, in accordance with which it can be provided that a base is configured, wherein a base frame of the receiving device is mounted on the base by means of a linear guide so as to be displaceable and that the rotor shaft support is coupled with the base. This results in the advantage that the rotor shaft support can serve to receive the rotor shaft in a precise alignment. A displaceability of the rotor shaft support enables the rotor shaft to be displaced during the jointing with the bearing block, so that a central alignment of the rotor shaft in the bearing block is enabled.

Further, it can be provided that a slide bearing pad reception ring is configured, which serves to affix the slide bearing pads, wherein the slide bearing pad reception ring is received on the inner ring element. This results in the advantage that, through this measure, the slide bearing pads can be firmly coupled with the inner ring element.

Furthermore, it can be provided that the slide bearing pad reception ring is shrunk onto the inner ring element. Particularly for rotor shafts, this is a highly sustainable and feasible bond. In the shrinking-on process, the slide bearing pad reception ring is heated and/or the inner ring element is cooled down in order to facilitate an axial forcing-on. After the temperature equalization, and therefore the equalization of the respective thermal expansions, a tight fit of the slide bearing pad reception ring on the inner ring element can be achieved.

In an alternative embodiment variant, or additionally, it can be provided that the slide bearing pad reception ring is coupled with the inner ring element by means of a material bond, such as a welded bond, for example.

In yet another embodiment variant, it can be provided that the slide bearing pad reception ring is coupled with the inner ring element by means of an interlocking bond, such as a screwed bond, for example. In particular, it can be provided that the It can further be provided that multiple tapped holes are configured in the slide bearing pad reception ring, which tapped holes are arranged in an axial direction of the slide bearing pad reception ring and serve to receive fastening screws, wherein pass-through holes are configured in the slide bearing pads, through which pass-through holes the fastening screws are plugged in order to clamp the slide bearing pads on the slide bearing pad reception ring by means of the fastening screws. Such a bond between the slide bearing pads and the slide bearing pad reception ring is simple to produce.

In one advancement, it can be provided that the slide bearing pads have a shoulder on their inner face, which shoulder rests against a front end of the slide bearing pad reception ring, wherein the pass-through holes are arranged in the region of the shoulder. With this measure, a sufficiently load-bearing connection between the slide bearing pad and the inner ring is achieved.

For the purpose of better understanding of the invention, it will be elucidated in more detail by means of the figures below.

Figure 2:
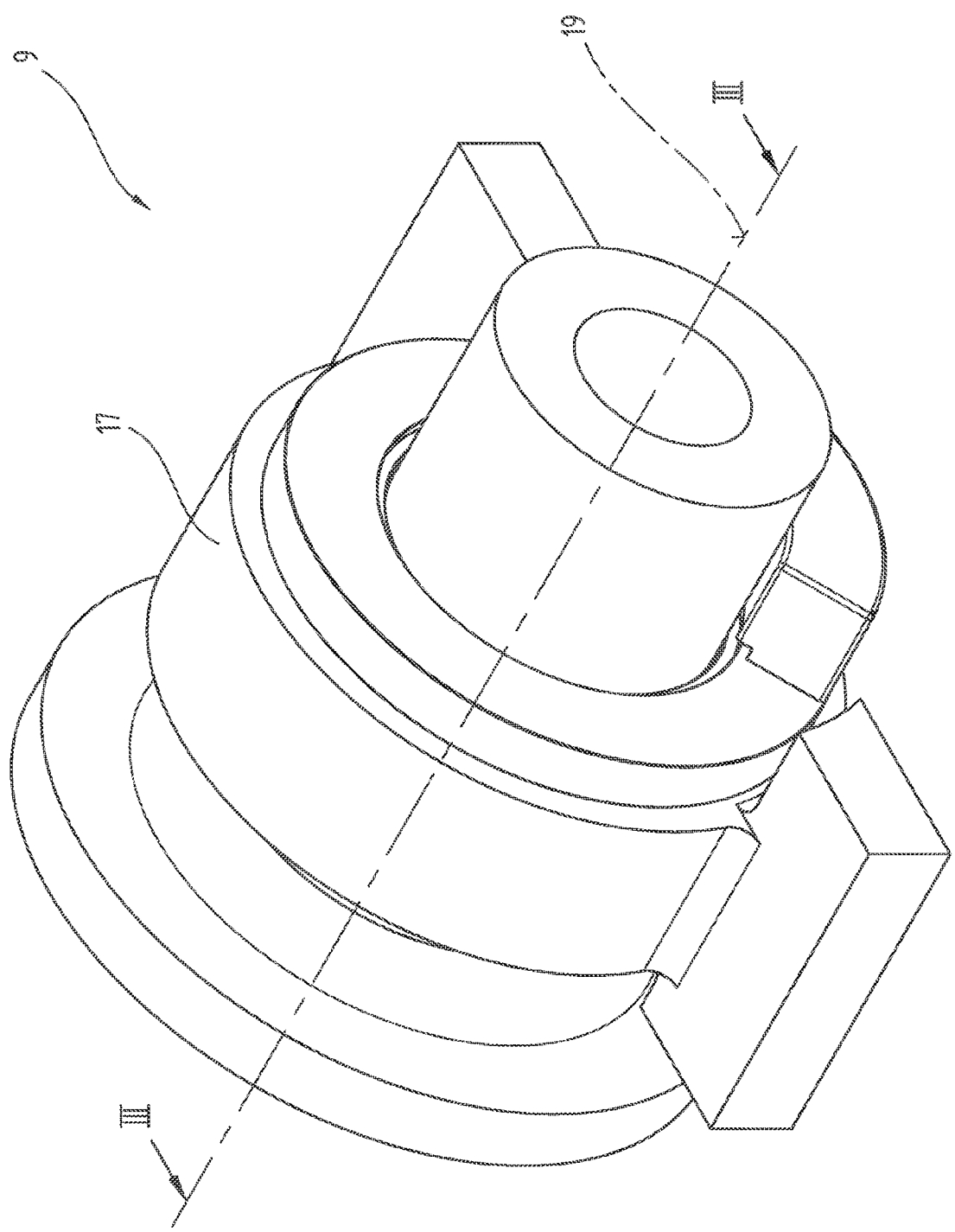
Figure 3:
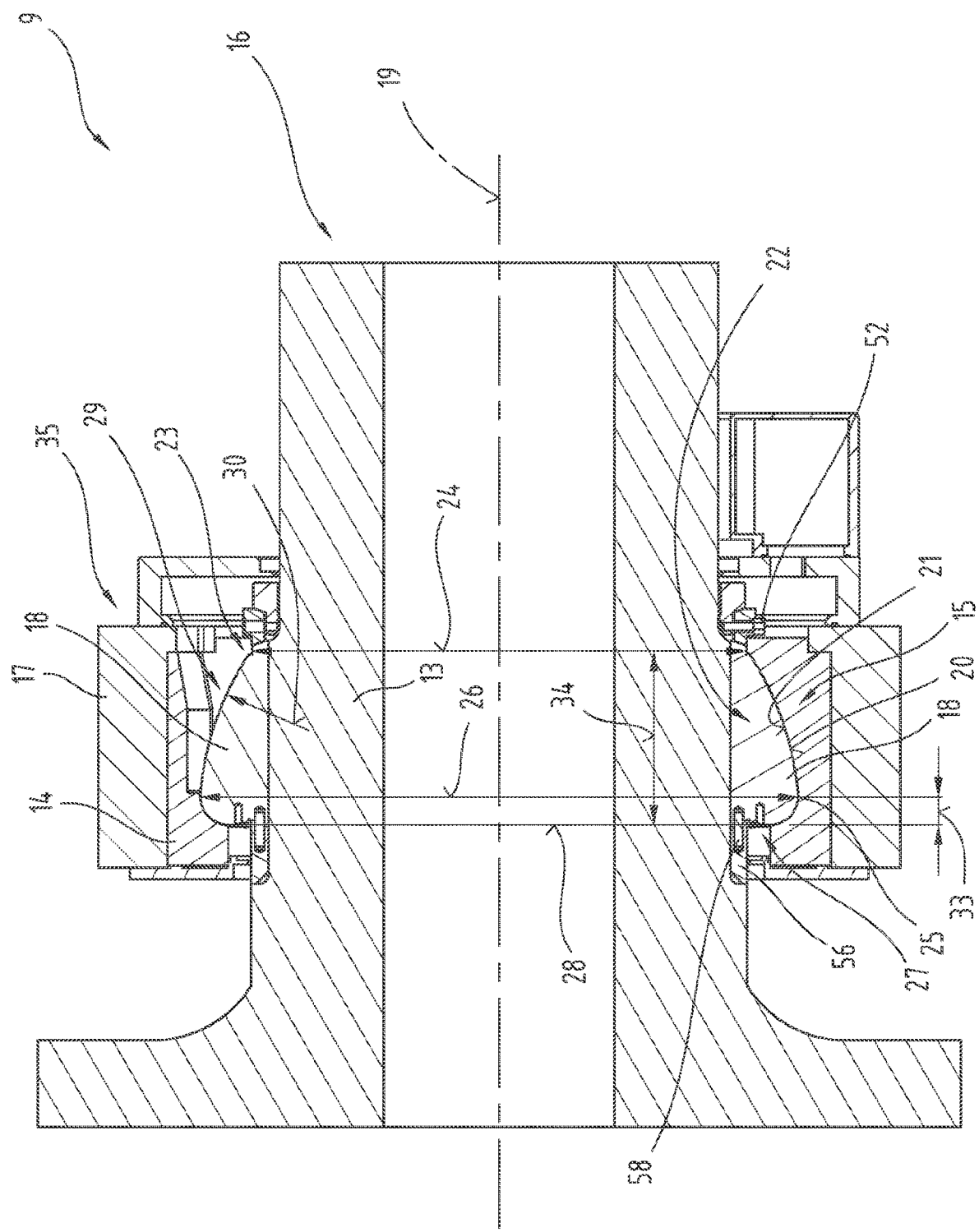
Figure 4:
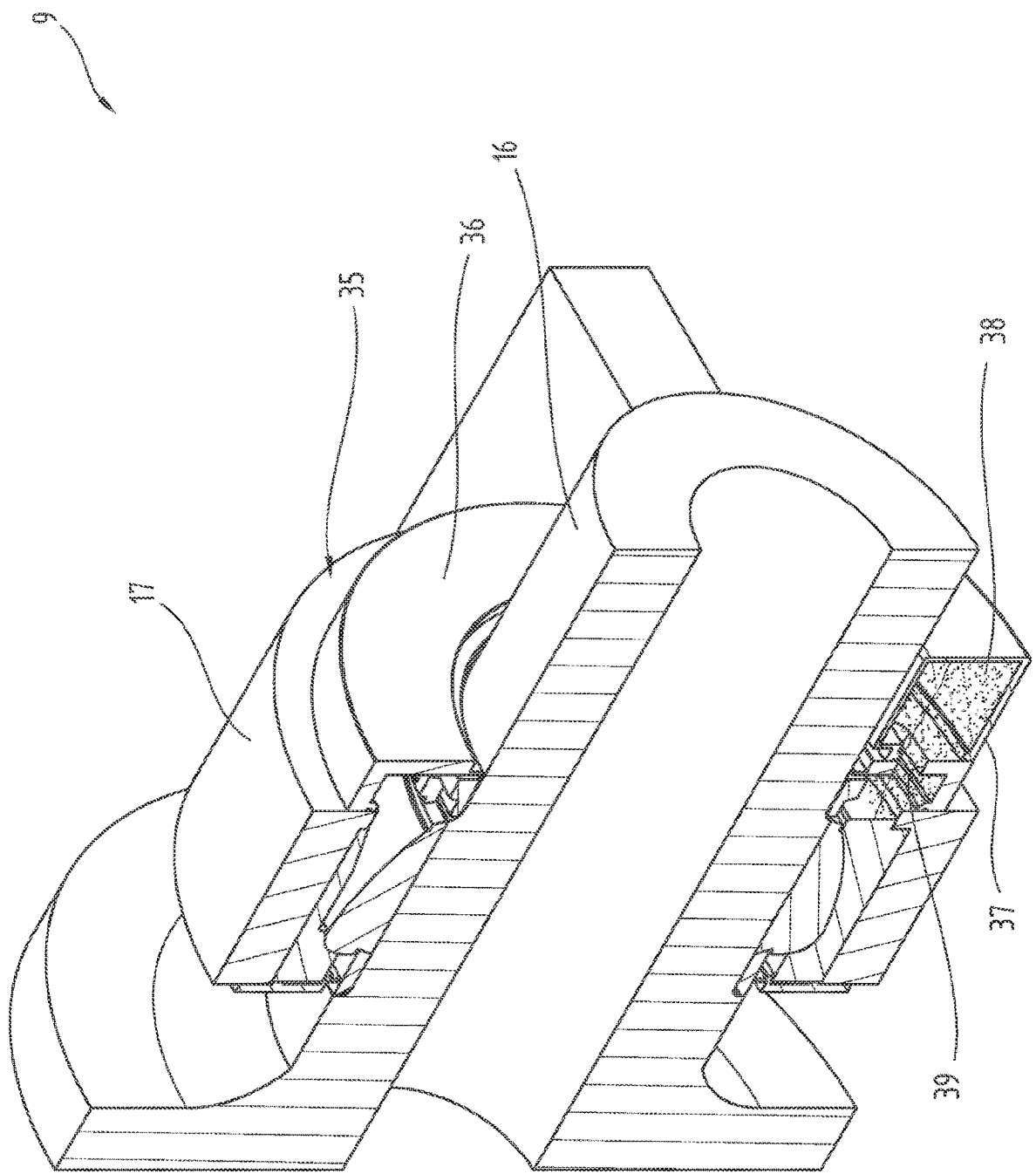
Figure 5:
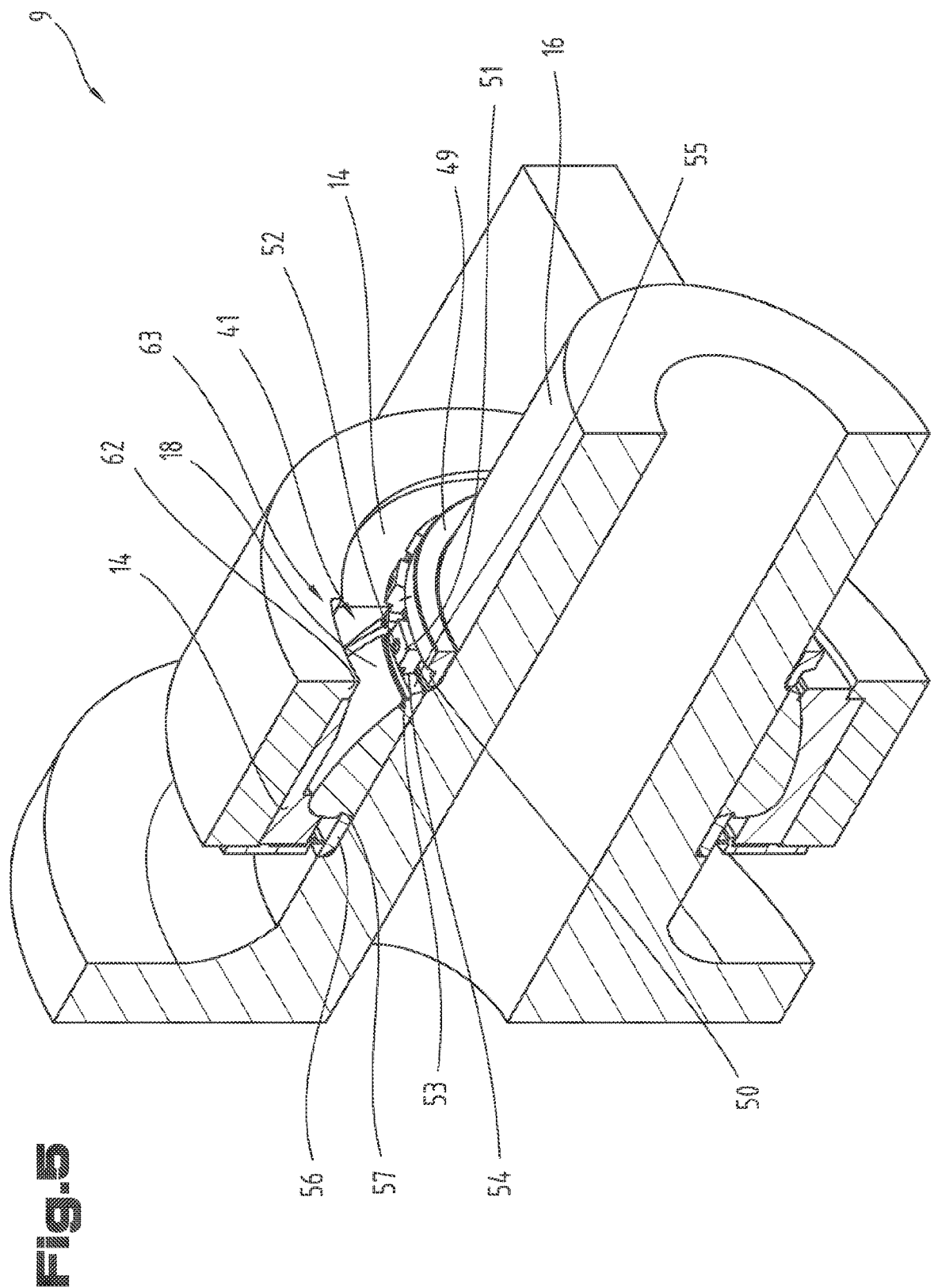
Figure 9:
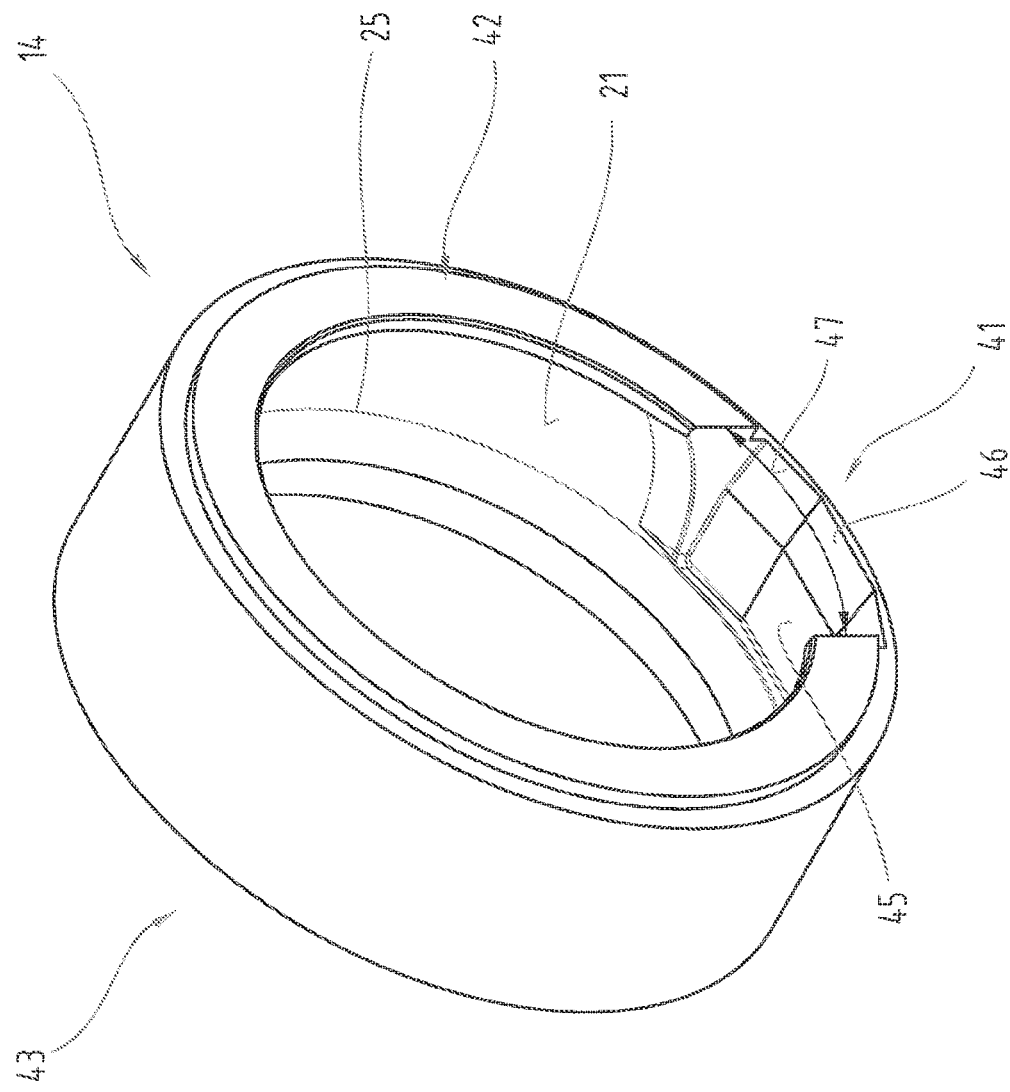
Figure 7:
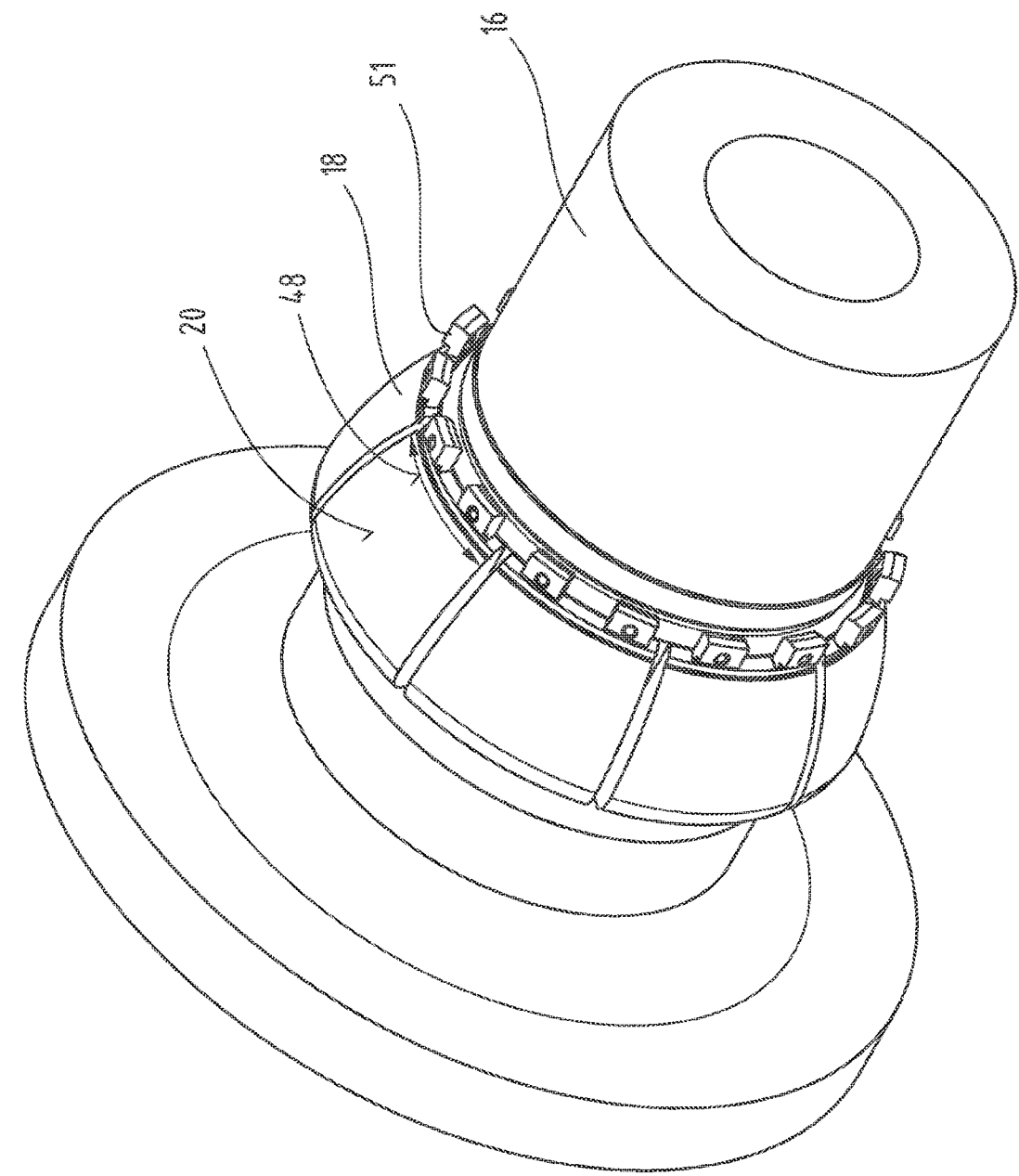
Figure 9:
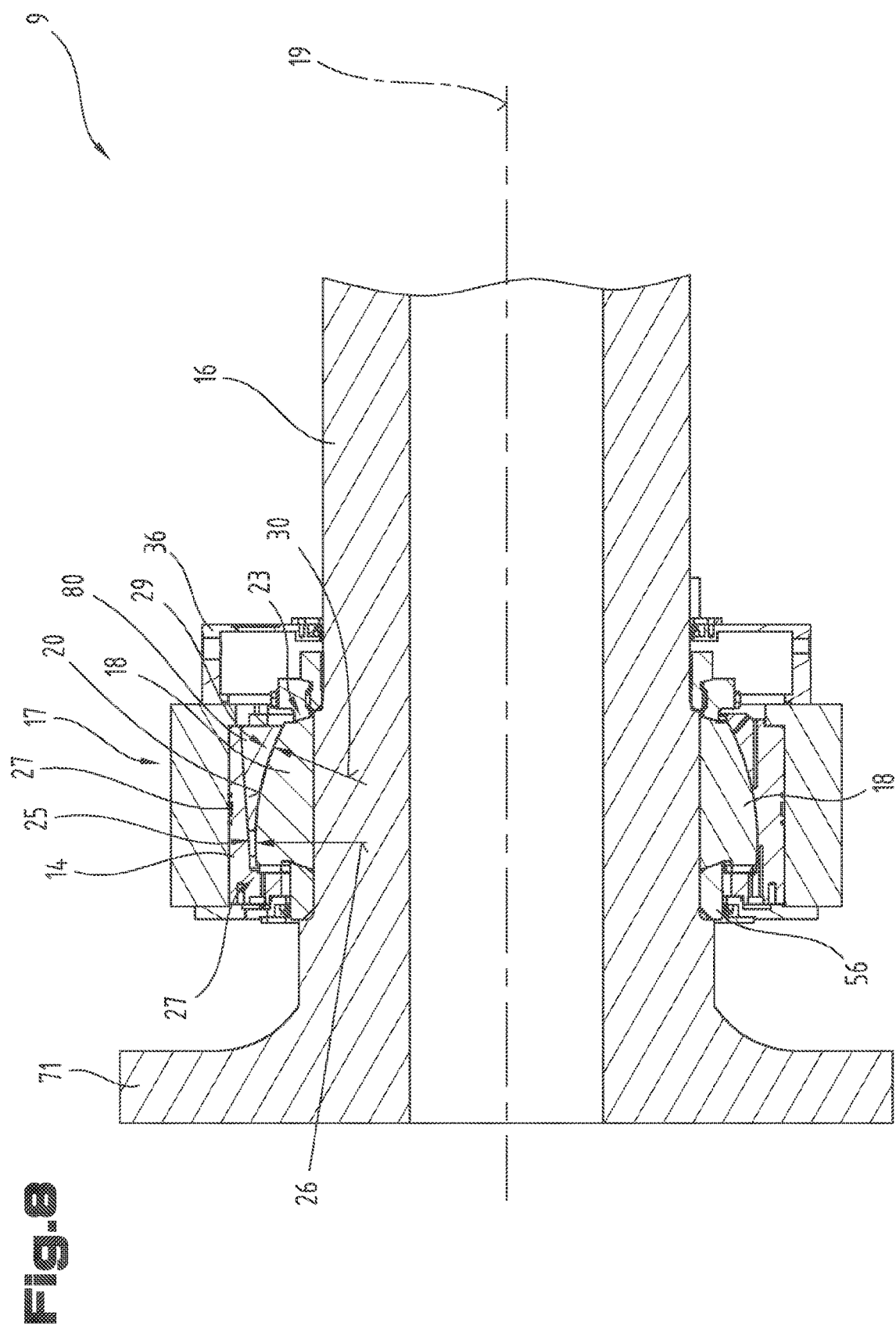
Figure 9:
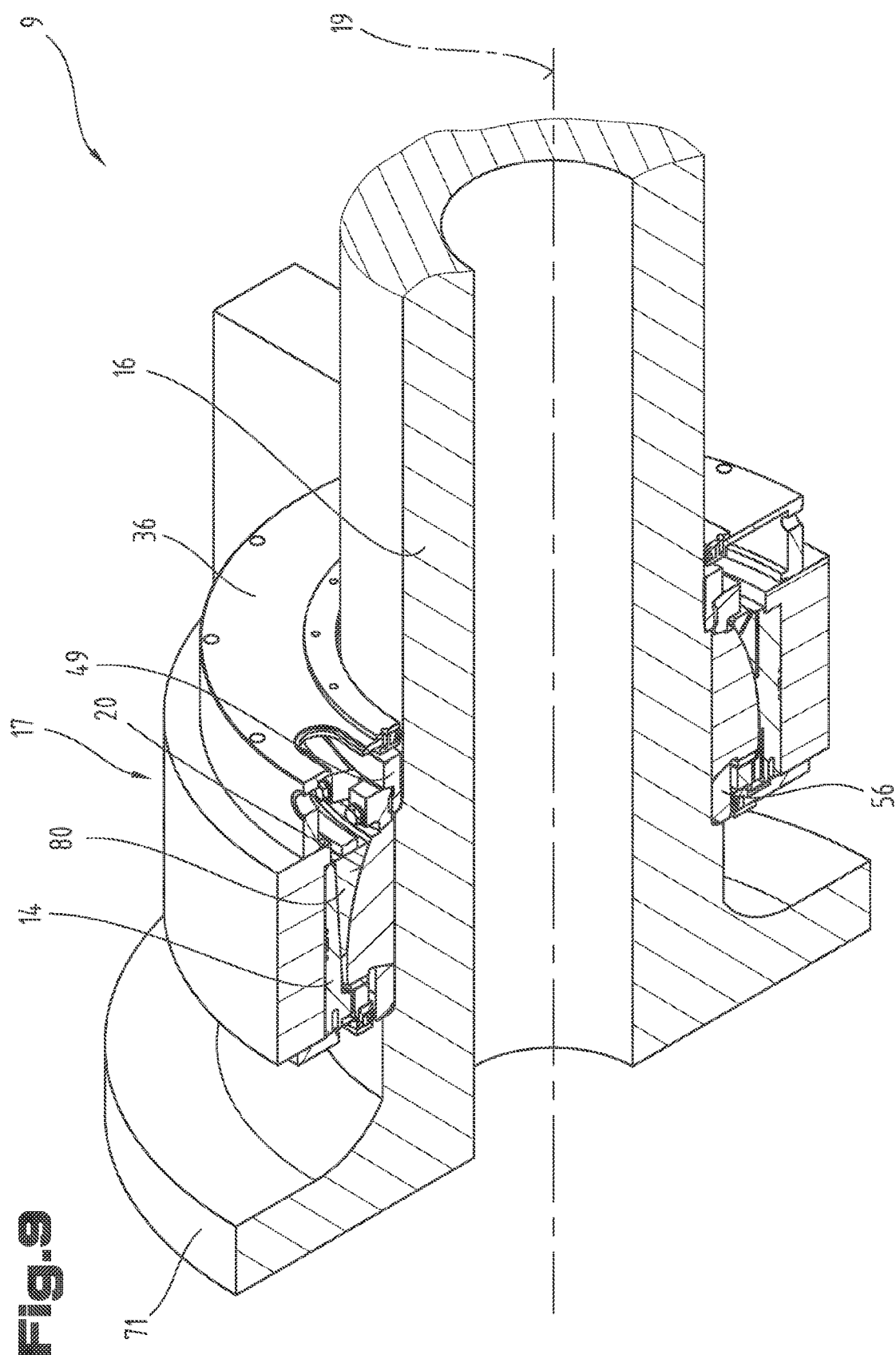
Figure 10:
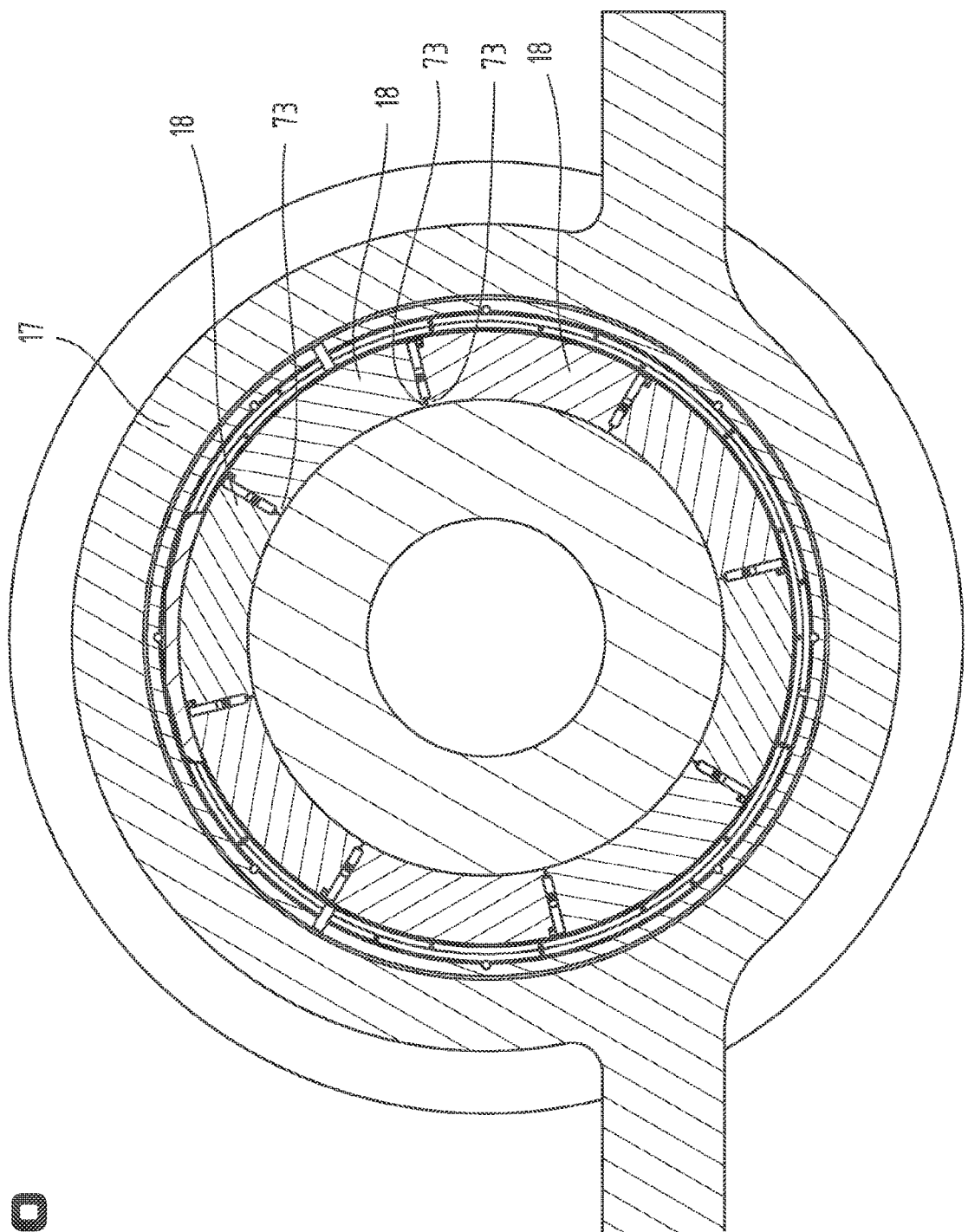
Figure 11:
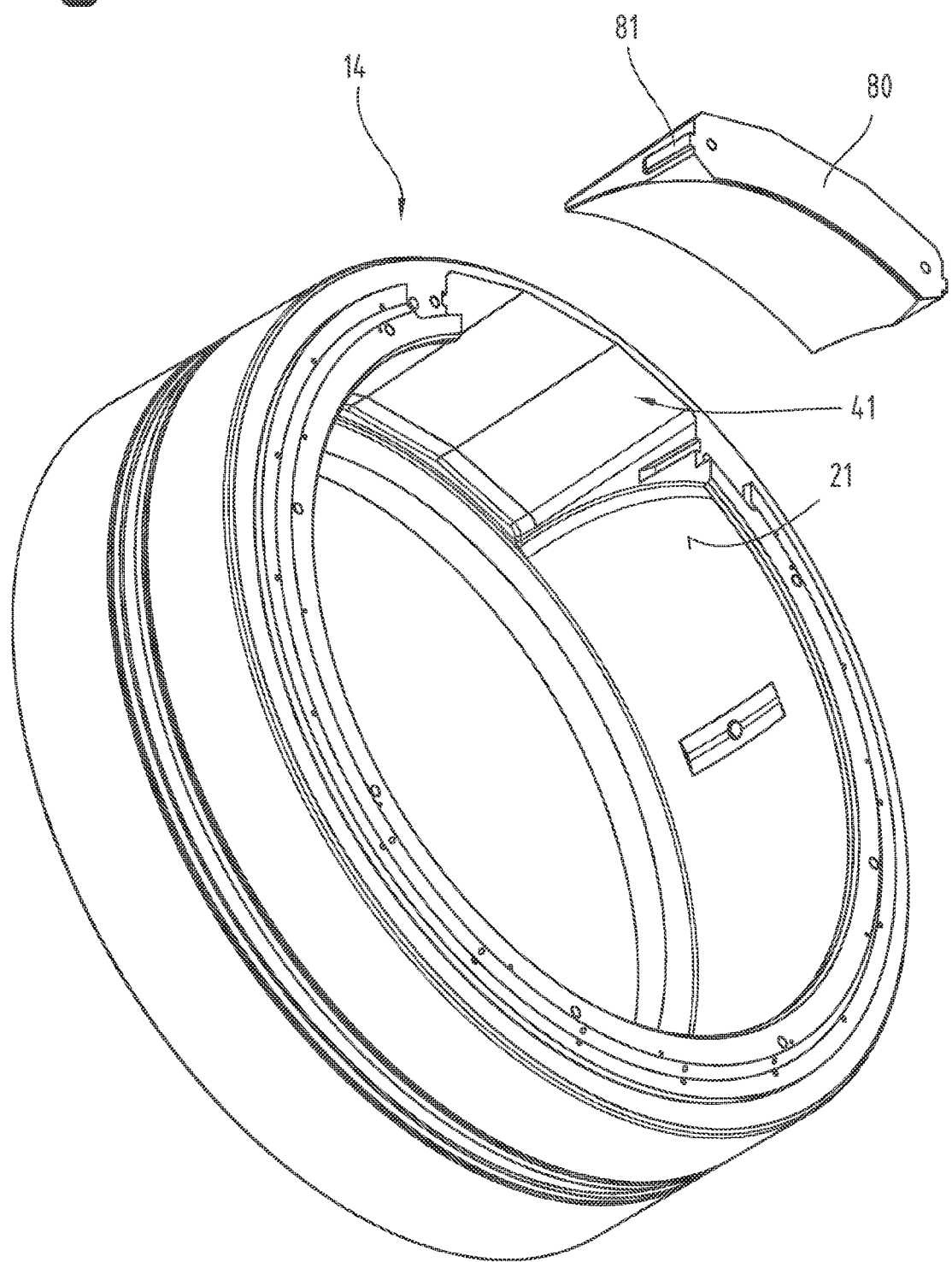
Figure 12:
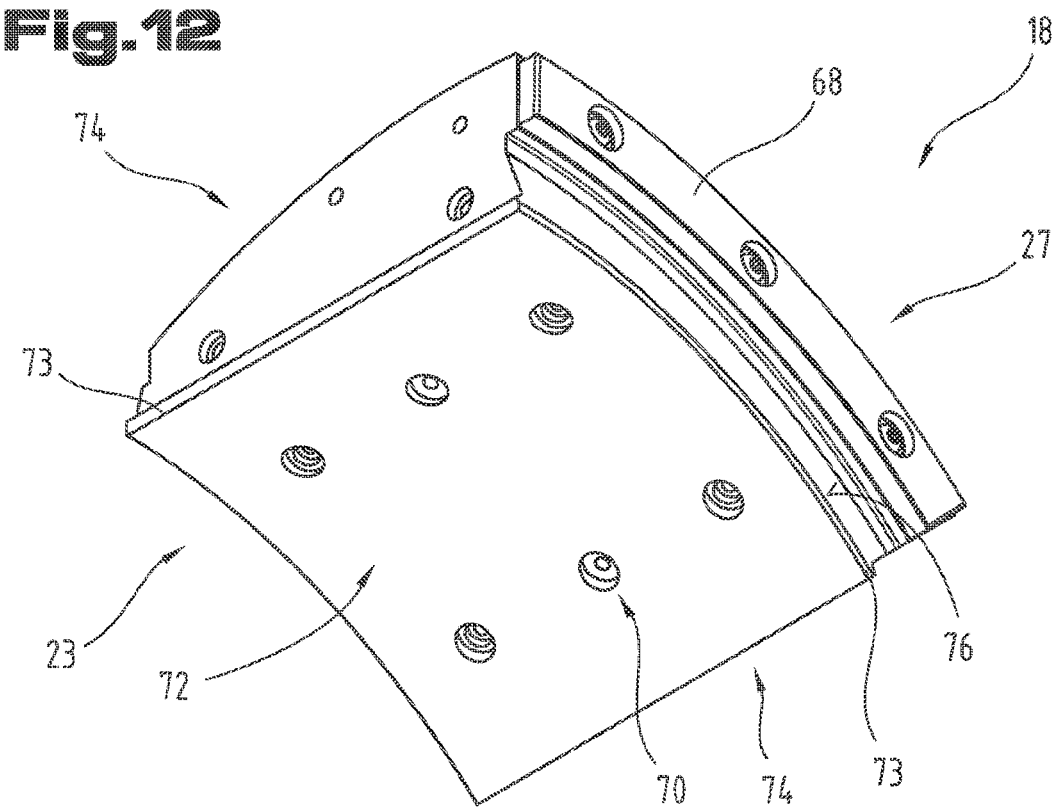
Figure 13:
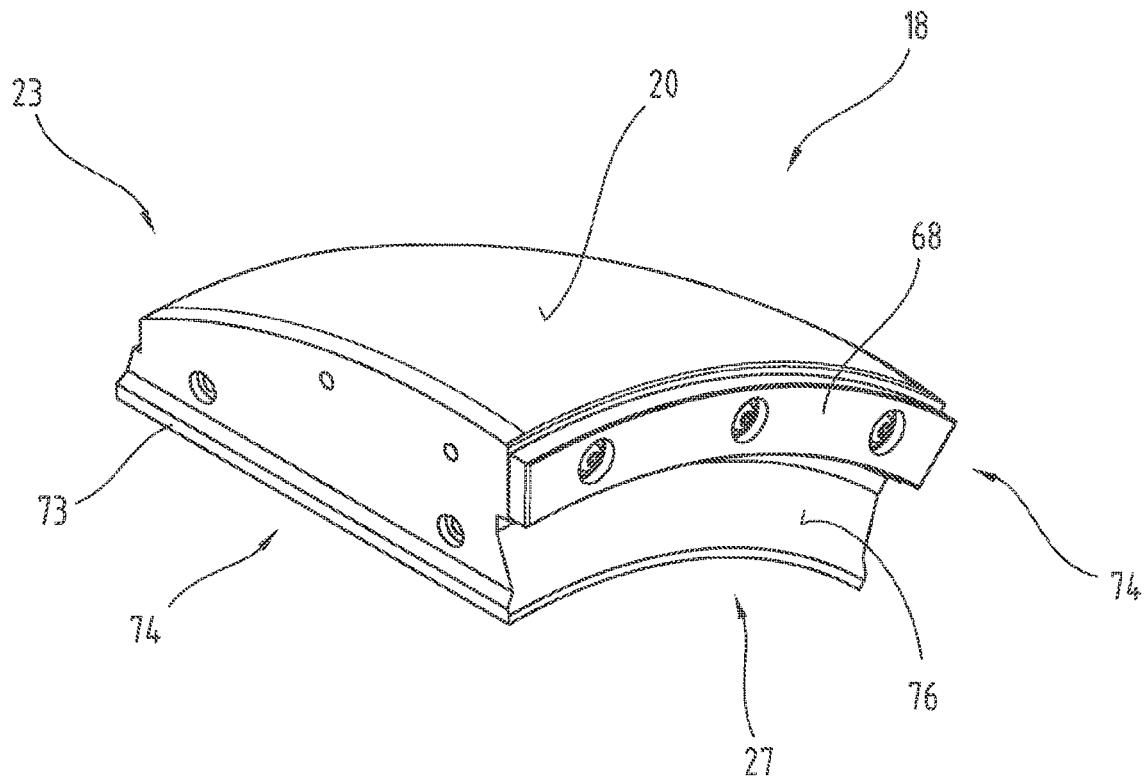
Figure 14:
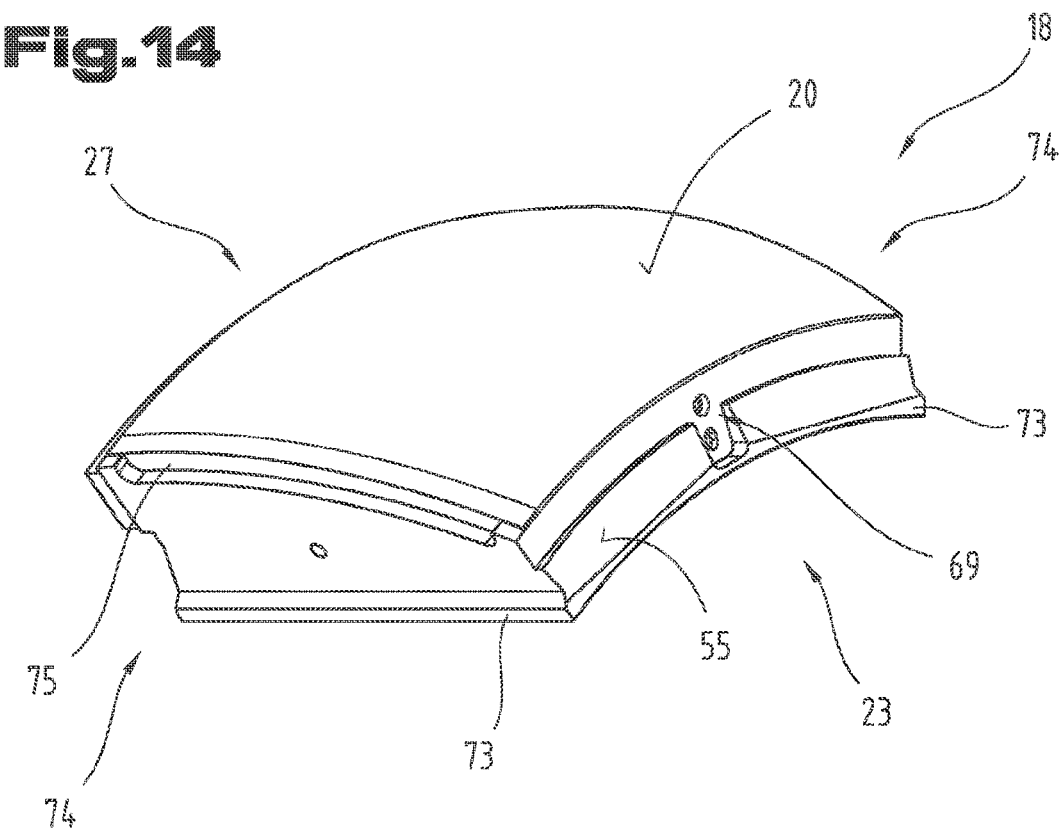
Figure 15:
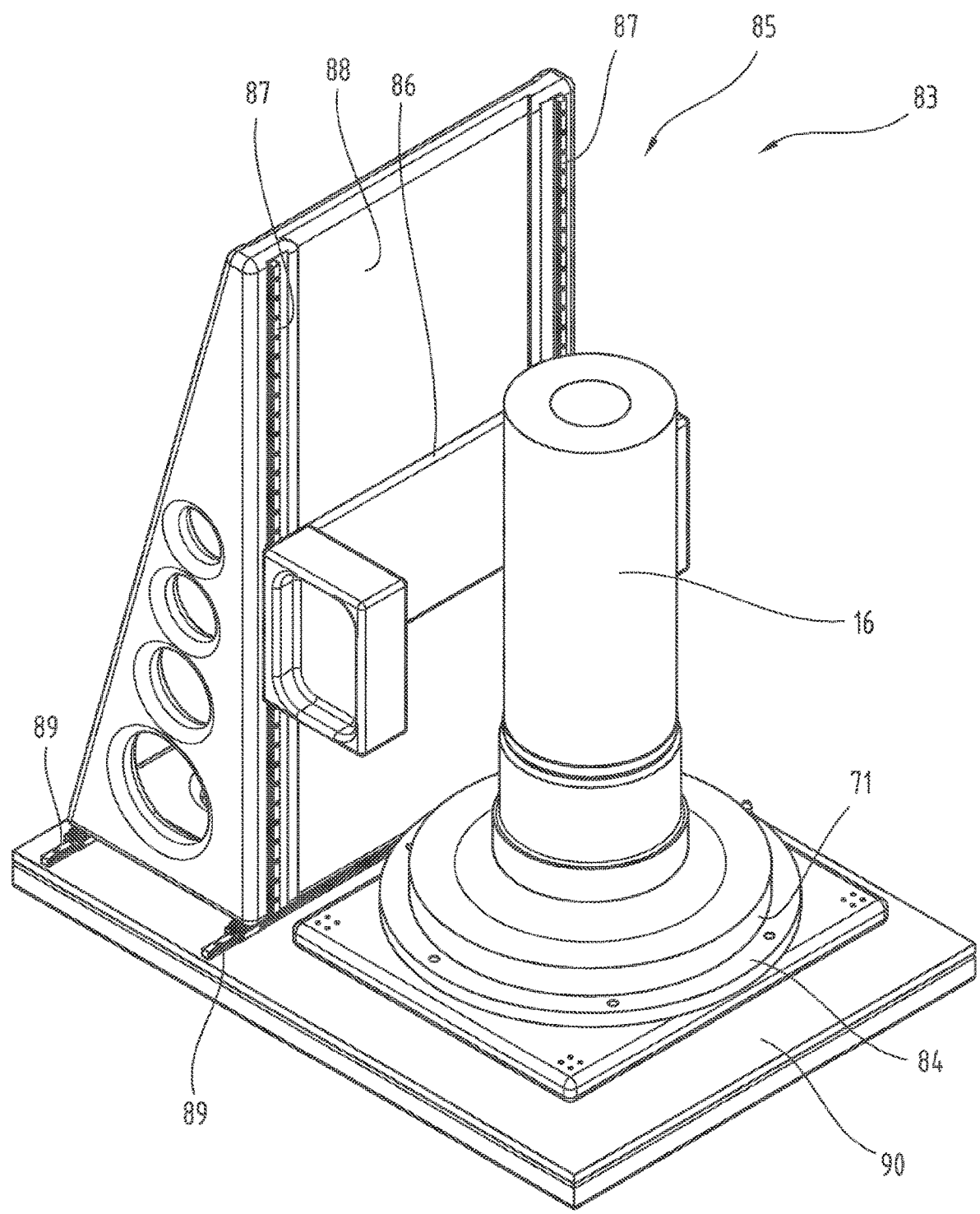
Figure 16:
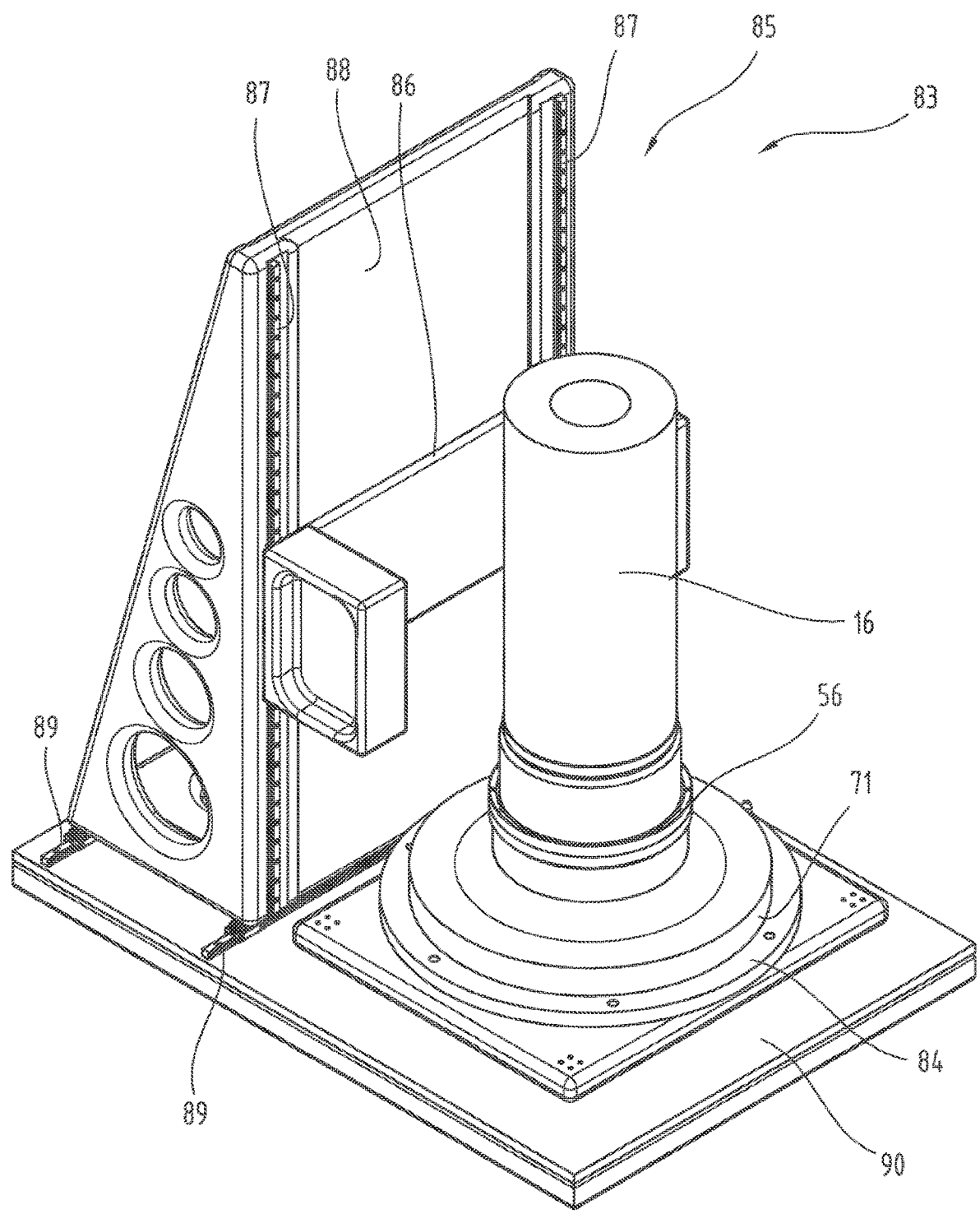
Figure 17:
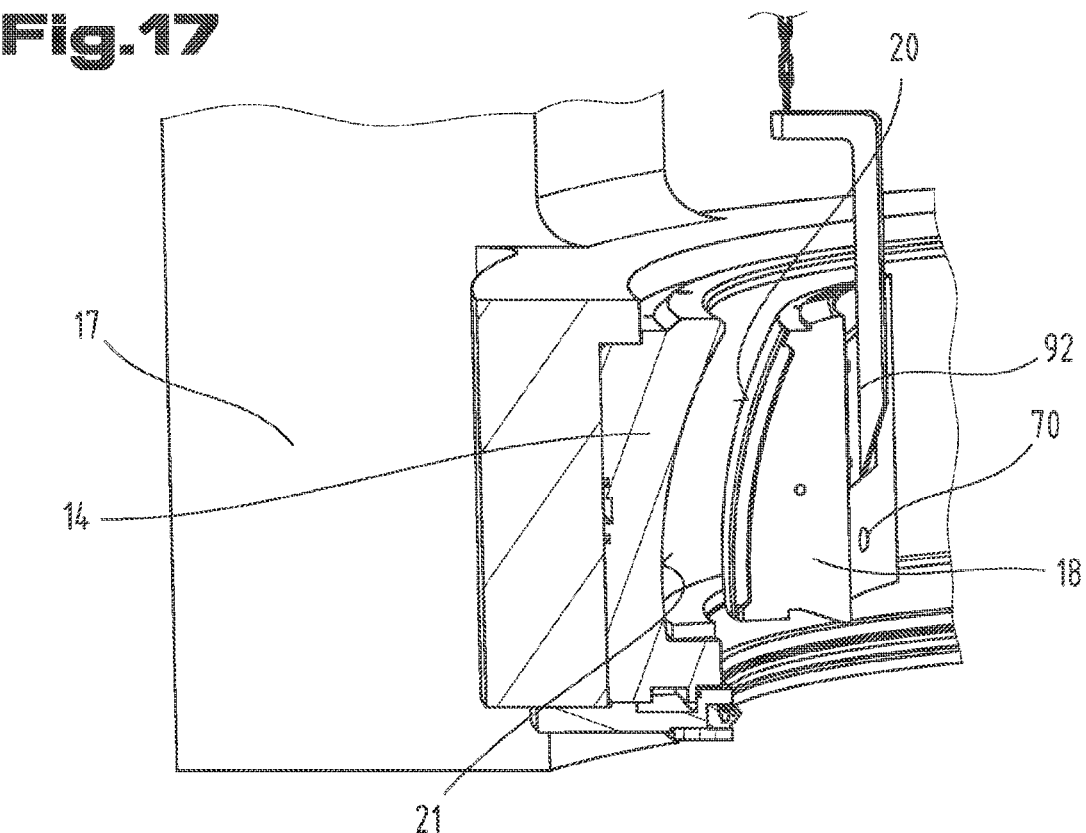
Figure 18:
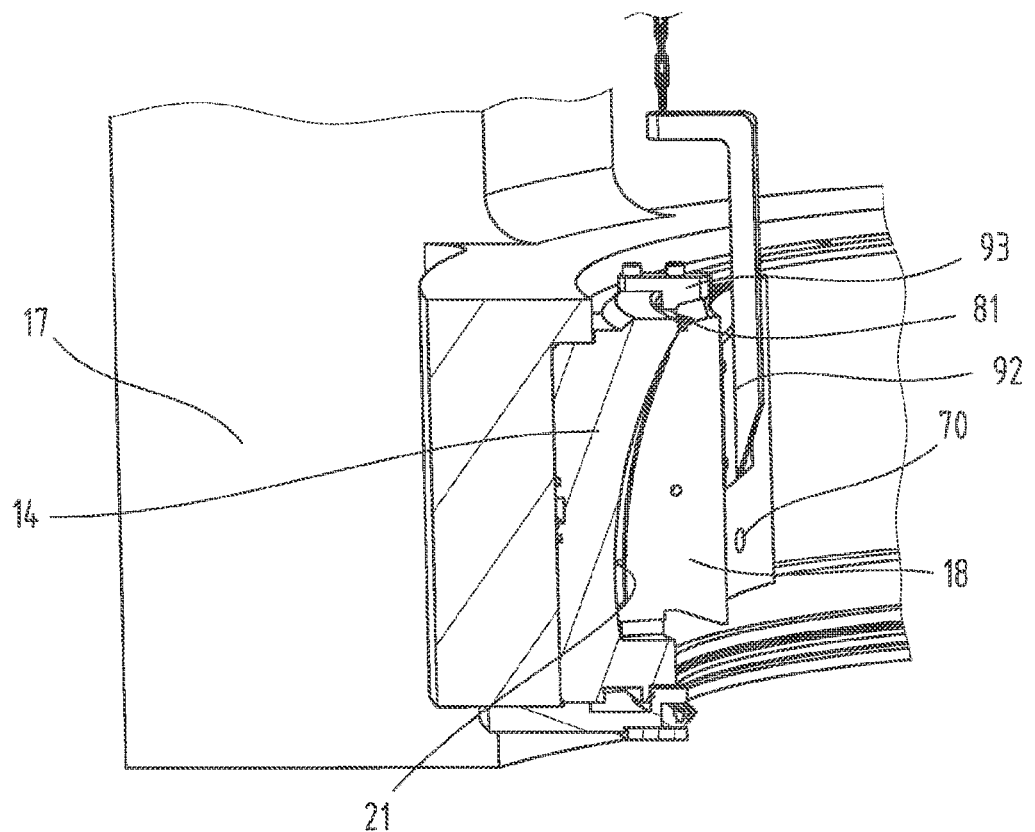
Figure 19:
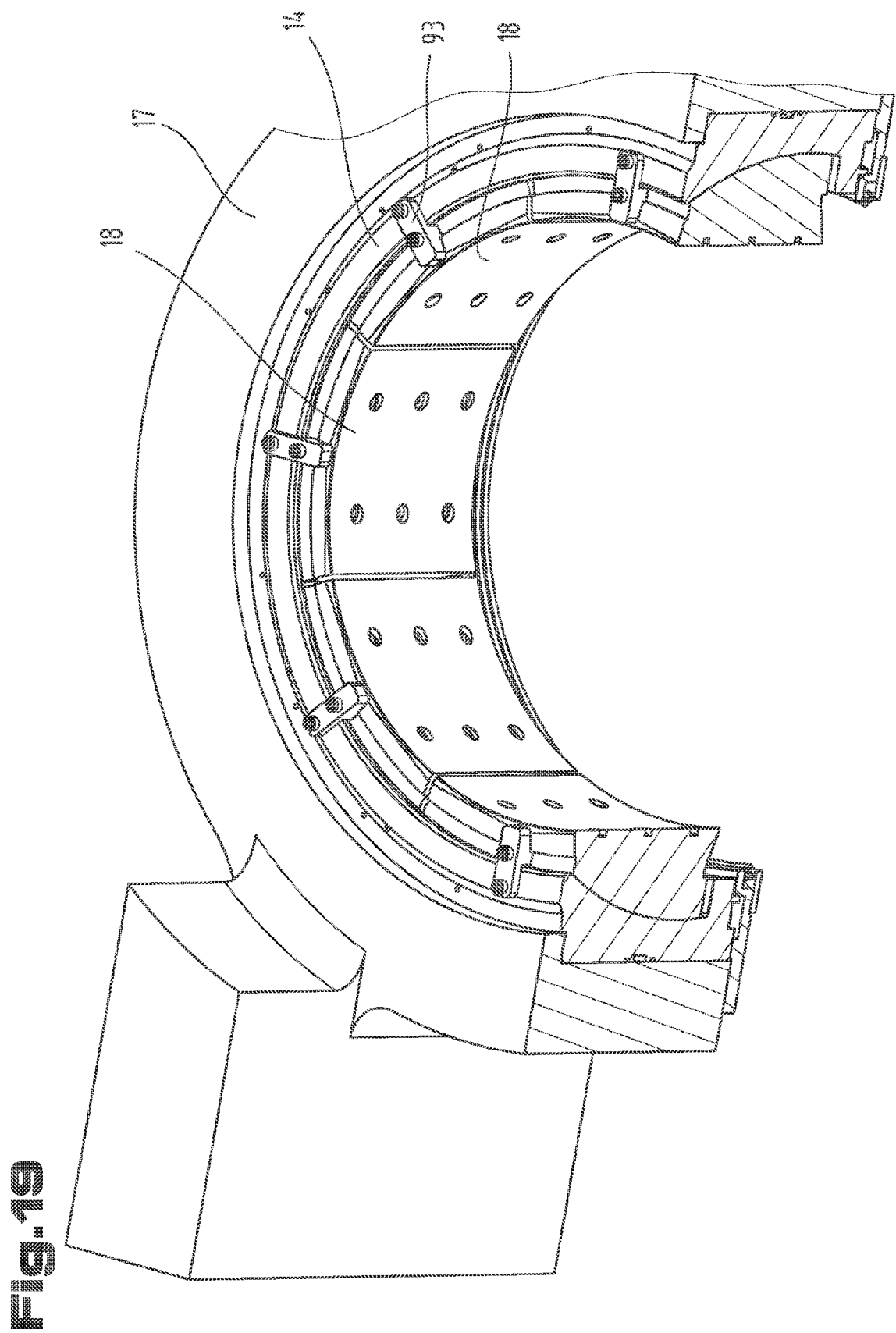
Figure 20:
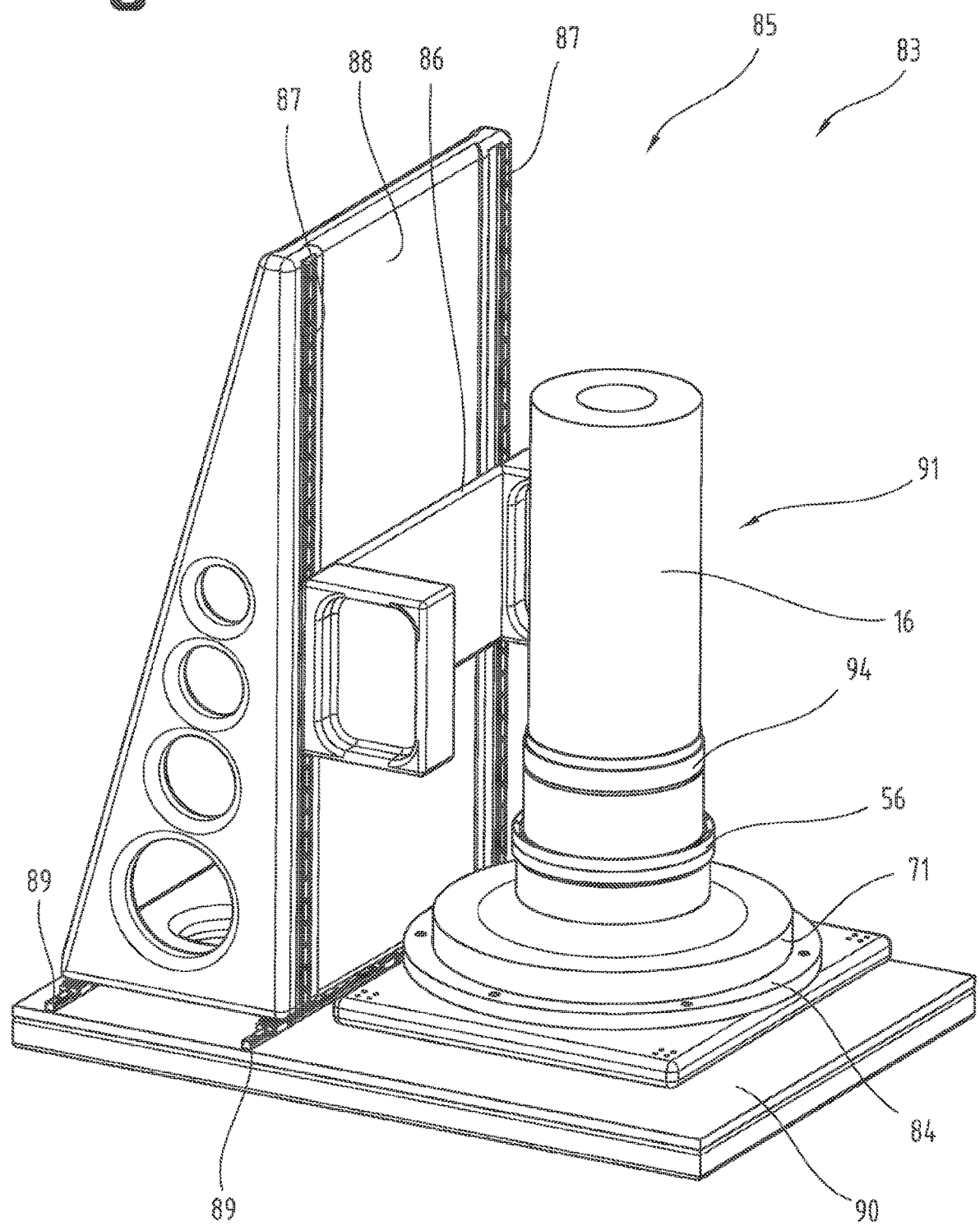
Figure 21:
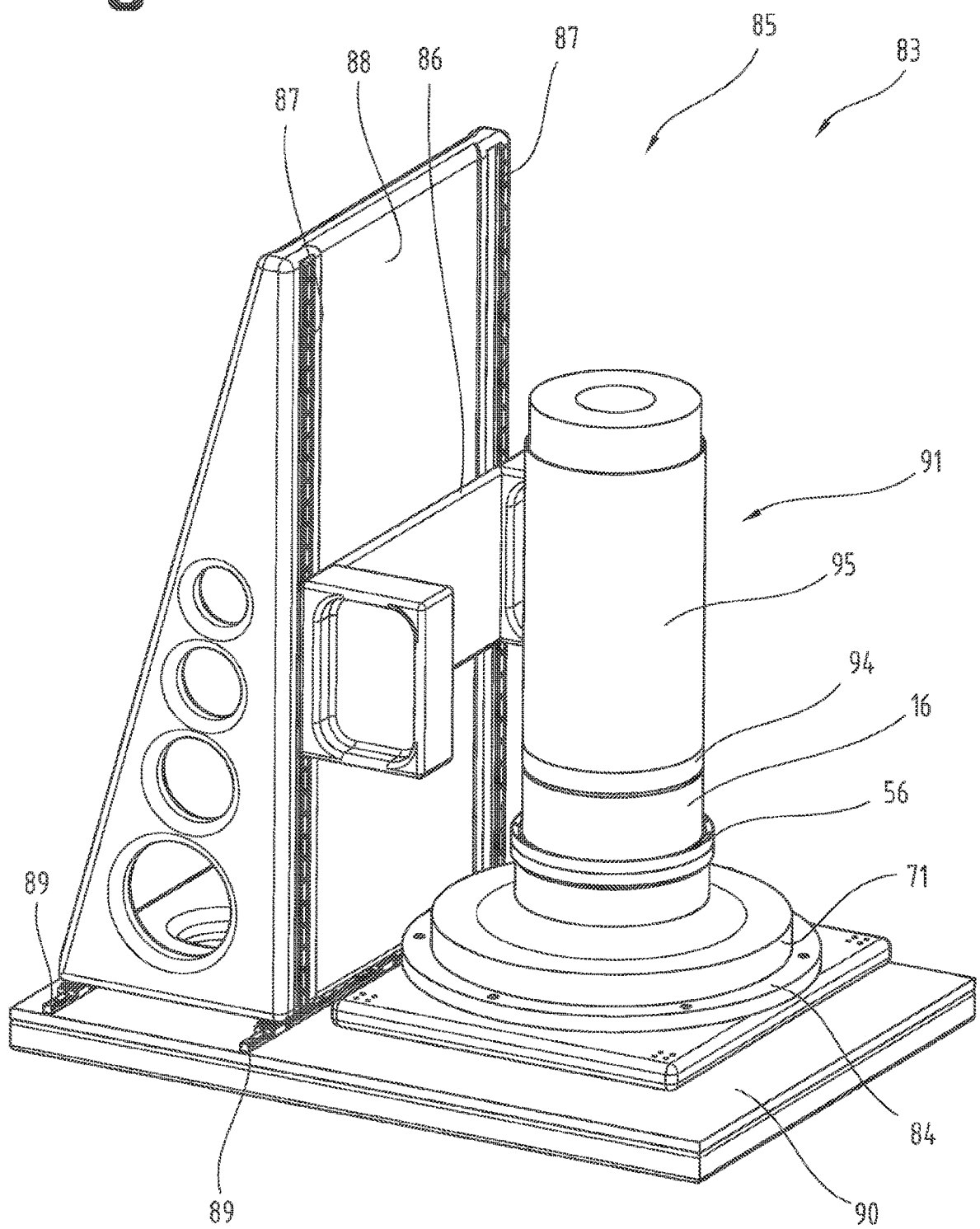
Figure 22:
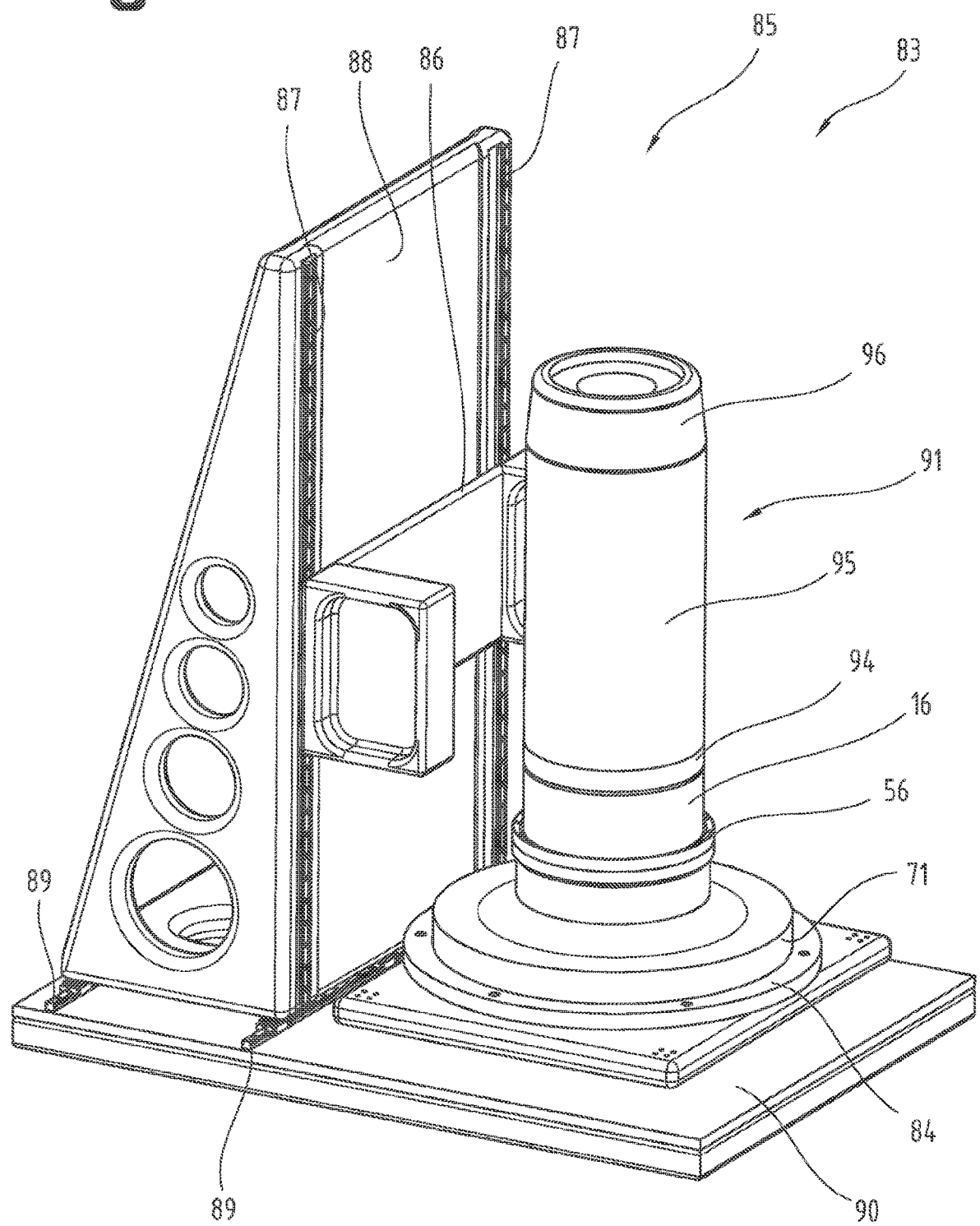
Figure 23:
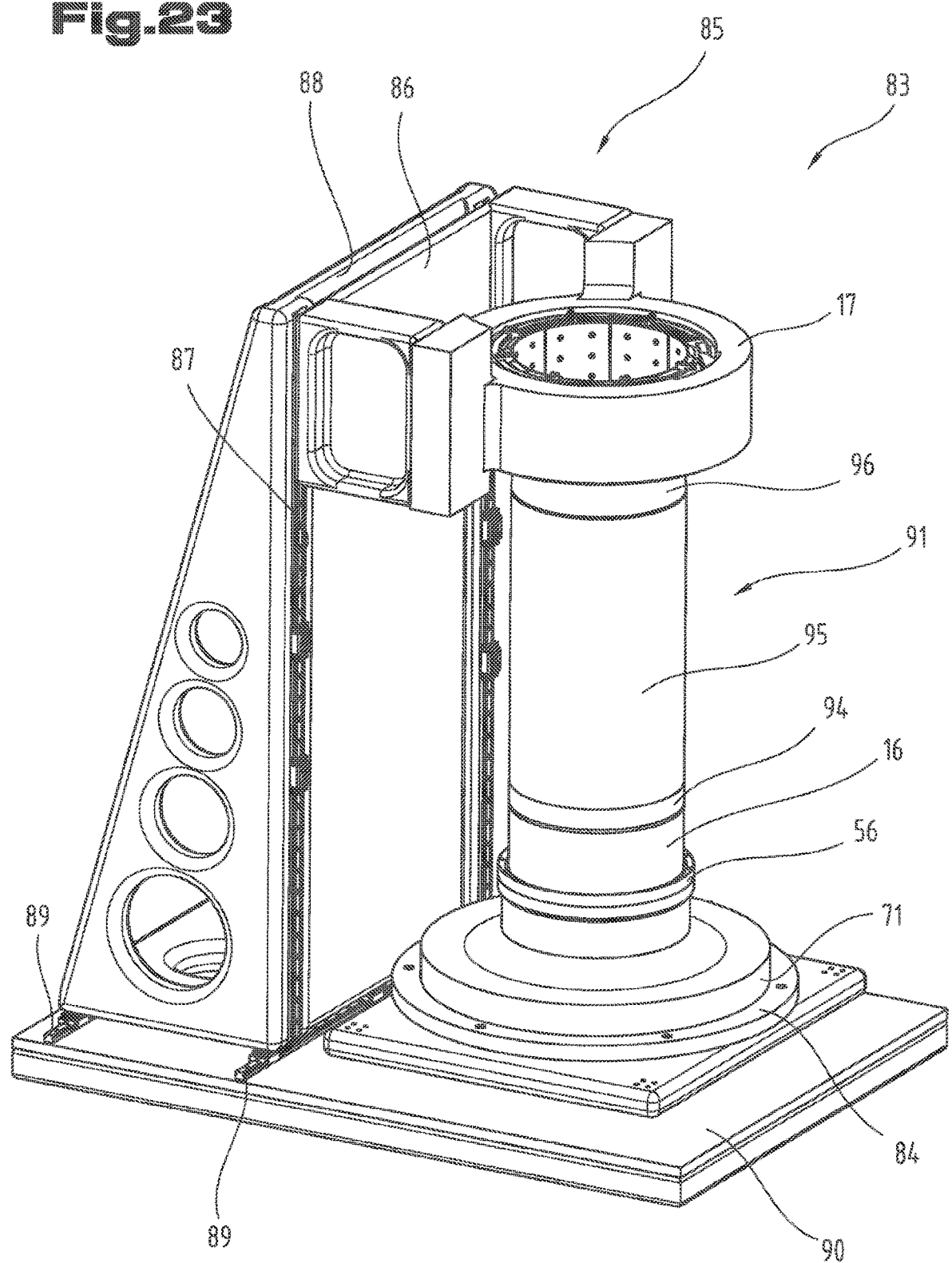
Figure 24:
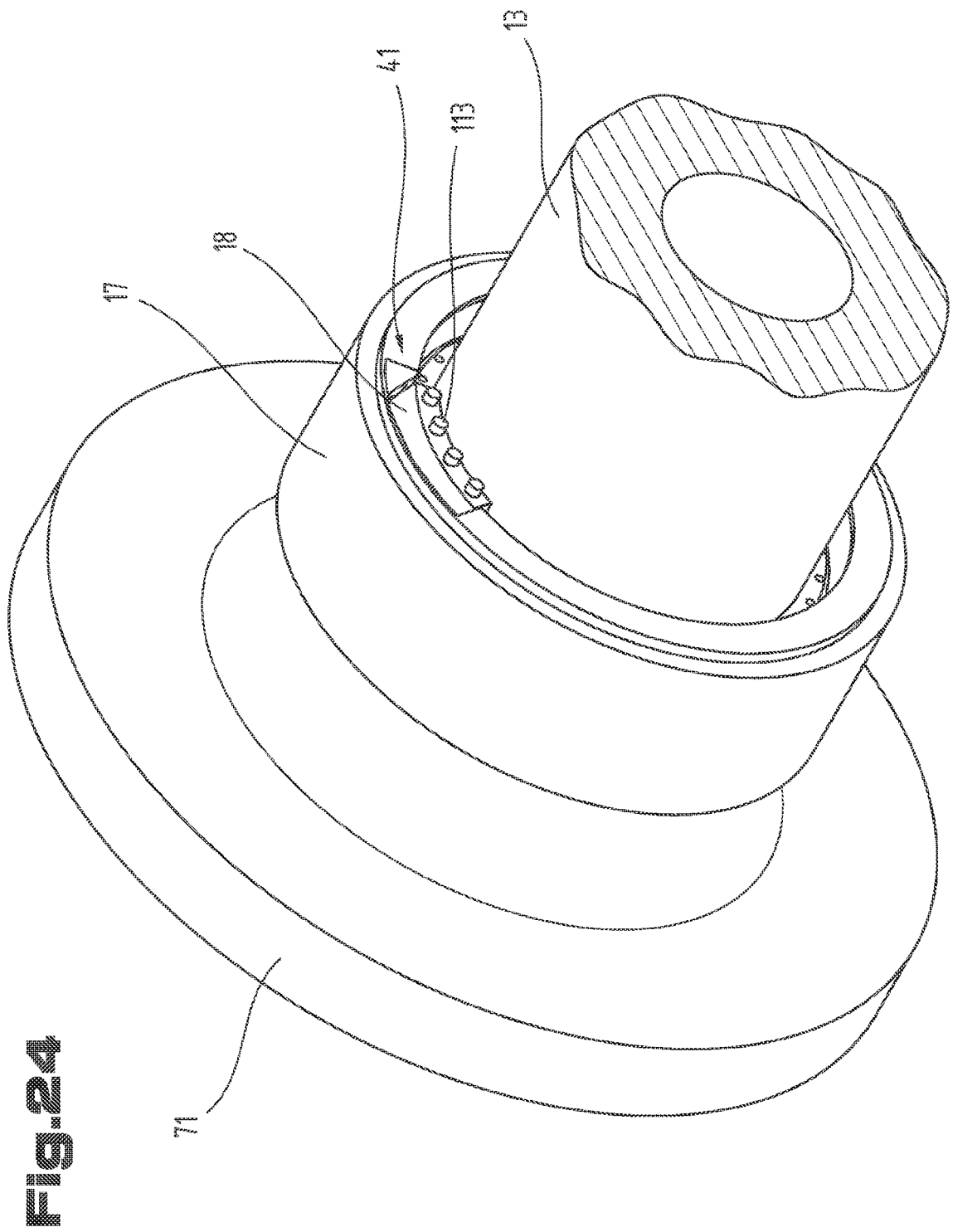
Figure 25:
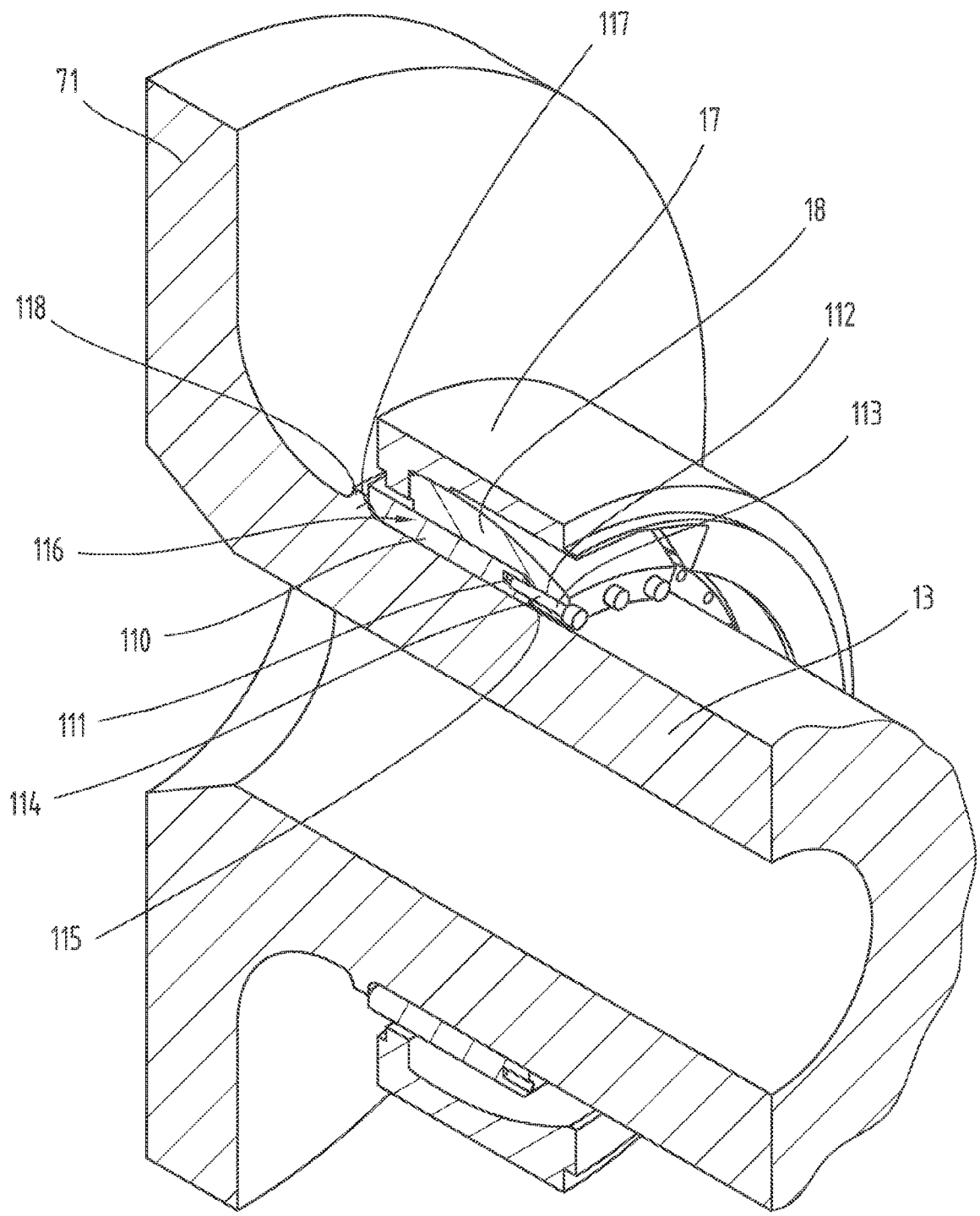

These show in a respectively very simplified schematic representation:

FIG. 1 a schematic representation of a wind turbine;

FIG. 2 a perspective representation of a first exemplary embodiment of a slide bearing arrangement;

FIG. 3 a longitudinal section of the first exemplary embodiment of the slide bearing arrangement;

FIG. 4 a perspective view of the longitudinal section of the first exemplary embodiment of the slide bearing arrangement;

FIG. 5 a perspective view of the longitudinal section of the first exemplary embodiment of the slide bearing arrangement, wherein a cover is blanked out;

FIG. 6 a perspective view of the first exemplary embodiment of an outer ring element;

FIG. 7 a perspective view of the first exemplary embodiment of a rotor shaft with slide bearing pads arranged thereupon;

FIG. 8 a longitudinal section of a third exemplary embodiment of the slide bearing arrangement;

FIG. 9 a perspective view of the longitudinal section of the third exemplary embodiment of the slide bearing arrangement;

FIG. 10 a cross section of the third exemplary embodiment of the slide bearing arrangement;

FIG. 11 a perspective representation of an outer ring element of the third exemplary embodiment of the slide bearing arrangement;

FIG. 12 a slide bearing pad of the third exemplary embodiment of the slide bearing arrangement in a first perspective representation;

FIG. 13 the slide bearing pad of the third exemplary embodiment of the slide bearing arrangement in a second perspective representation;

FIG. 14 the slide bearing pad of the third exemplary embodiment of the slide bearing arrangement in a third perspective representation;

FIG. 15 a perspective representation of a first method step for jointing a rotor shaft with a bearing block;

FIG. 16 a perspective representation of a second method step for jointing the rotor shaft with the bearing block;

FIG. 17 a perspective representation of a third method step for jointing the rotor shaft with the bearing block;

FIG. 18 a perspective representation of a fourth method step for jointing the rotor shaft with the bearing block;

FIG. 19 a perspective representation of a fifth method step for jointing the rotor shaft with the bearing block;

FIG. 20 a perspective representation of a sixth method step for jointing the rotor shaft with the bearing block;

FIG. 21 a perspective representation of a seventh method step for jointing the rotor shaft with the bearing block;

FIG. 22 a perspective representation of an eighth method step for jointing the rotor shaft with the bearing block;

FIG. 23 a perspective representation of a ninth method step for jointing the rotor shaft with the bearing block;

FIG. 24 another exemplary embodiment of the slide bearing arrangement with slide bearing pads, which are screwed to a slide bearing pad reception ring, in a first perspective view;

FIG. 25 the other exemplary embodiment of the slide bearing arrangement with slide bearing pads, which are screwed to the slide bearing pad reception ring, in a sectional view;

FIG. 26 a perspective representation of an alternative embodiment of the fifth method step for jointing the rotor shaft with the bearing block.

First of all, it is to be noted that, in the different embodiments described, equal parts are provided with equal reference numbers and/or equal component designations, where the disclosures filled into in the entire description may be analogously transferred to equal parts with equal reference numbers and/or equal component designations. Moreover, the specifications of location, such as at the top, at the bottom, at the side, chosen in the description refer to the directly described and depicted figure, and in case of a change of position, these specifications of location are to be analogously transferred to the new position.

FIG. 1 shows, in a schematic representation, a first exemplary embodiment of a wind turbine 1 for generating electric energy from wind energy. The wind turbine 1 comprises a nacelle 2, which is received on a tower 3 so as to be rotatable. The nacelle 2 comprises a nacelle housing 4, which forms the main structure of the nacelle 2. Arranged in the nacelle housing 4 of the nacelle 2 are the electrotechnical components such as a generator of the wind turbine 1, for example.

Further, a rotor 5 is configured, which has a rotor hub 6 with rotor blades 7 arranged thereupon. The rotor hub 6 is considered part of the nacelle 2. The rotor hub 6 is received on the nacelle housing 4 by means of a rotor bearing arrangement 8 so as to be rotatably movable. In particular, it is provided that a slide bearing arrangement 9 in accordance with the invention, which slide bearing arrangement 9 will be described in more detail below, is used as rotor bearing arrangement 8. In particular, it can be provided that the rotor hub 6 is arranged on a rotor shaft 16, wherein the rotor shaft 16 is mounted in the rotor bearing arrangement 8.

The rotor bearing arrangement 8, which serves to mount the rotor hub 6 on the nacelle housing 4 of the nacelle 2, is configured for receiving a radial force 10 and an axial force 11. The axial force 11 is a result of the force of the wind. The radial force 10 is a result of the weight of the rotor 5 and acts on the center of gravity of the rotor 5. As the center of gravity of the rotor 5 lies outside of the rotor bearing arrangement 8, a tilting moment 12 is caused in the rotor bearing arrangement 8 by the radial force 10. The tilting moment 12 can equally be caused by an uneven load on the rotor blades 7. This tilting moment 12 can be absorbed by means of a second bearing arrangement, which is arranged at a distance to the rotor bearing arrangement 8. The second bearing arrangement can be configured in the region of the generator, for example.

FIG. 2 shows a first exemplary embodiment of the slide bearing arrangement 9 integrated in the nacelle 2. Of course, the slide bearing arrangement 9 represented in FIG. 2 can also be used in any and all other industrial applications outside of wind turbines. The slide bearing arrangement 9 is represented in FIG. 2 in a perspective view.

FIG. 3 shows the first exemplary embodiment of the slide bearing arrangement 9 in a longitudinal sectional representation.

Subsequently, the slide bearing arrangement 9 is described by means of a combination of FIGS. 2 and 3.

As can be seen from FIGS. 2 and 3, it can be provided that the slide bearing arrangement 9 has an inner ring element 13 and an outer ring element 14. Arranged between the inner ring element 13 and the outer ring element 14 is a slide bearing element 15, which serves to mount the inner ring element 13 relative to the outer ring element 14 in a rotational slide bearing arrangement.

In the exemplary embodiment which is represented in FIGS. 2 and 3, the inner ring element 13 is configured as rotor shaft 16. Of course, the inner ring element 13 can also be any other type of shaft. Further, it is also conceivable that the inner ring element 13 is configured as an independent component, which is received on a shaft, in particular on a rotor shaft 16.

As can be seen particularly readily from FIG. 3, it can be provided that the outer ring element 14 is received in a bearing block 17. In particular, it can be provided that the bearing block 17 is coupled with the nacelle housing 4, or is alternatively also directly shaped in the nacelle housing 4. In this exemplary embodiment, it can therefore be provided that the outer ring element 14 is rigidly coupled with the nacelle housing 4 and the inner ring element 13 is rotatable, by means of the slide bearing element 15, relative to the outer ring element 14 with respect to an axis of rotation 19.

Further, it can be provided that the bearing block 17 serves directly as outer ring element 14.

Therefore, the rotor shaft 16 is received in the nacelle housing 4, by means of the slide bearing arrangement 9, so as to be rotatable.

As can further be seen from FIGS. 2 and 3, it can be provided that the slide bearing element comprises multiple individual slide bearing pads 18, which are arranged across the circumference so as to be distributed between the inner ring element 13 and the outer ring element 14.

Due to the structure shown in FIG. 3, the individual slide bearing pads 18 are firmly coupled with the inner ring element 13 in the operating mode of the slide bearing arrangement 9 and therefore rotate with same relative to the outer ring element 14. To enable the rotational movement between the inner ring element 13 and the outer ring element 14, a bearing surface is configured on each of the individual slide bearing pads 18, which rests against a mating surface 21 of the outer ring element 14 in the ready mode of the slide bearing arrangement 9. The mating surface 21 is arranged on an inner face 22 of the outer ring element 14.

The bearing surface 20 of the slide bearing pad 18 and the mating surface 21 of the outer ring element 14 are configured as sliding surfaces, which slide against each other during operation of the slide bearing arrangement 9. In particular, it can be provided that the mating surface 21 of the outer ring element 14 is configured as a hard, wear-resistant surface, which can be formed by a hardened steel, for example. The bearing surface 20 of the slide bearing pad 18 can be formed from a slide bearing raw material that is soft in comparison to the mating surface 21. Of course, it is also conceivable that the bearing surface 20 has a slide coating.

As can be seen particularly readily from FIG. 3, it can be provided that the individual slide bearing pads 18 each have a bearing surface 20 that is cambered, viewed in an axial direction.

As can further be seen from FIG. 3, it can be provided that the bearing surface 20 has a first diameter 24 in the region of a first front end 23 of the slide bearing pad 18. Starting from this first front end 23, the bearing surface 20 can have a diameter increase towards an apex 25. The bearing surface 20 can have a diameter 26 at the apex 25.

Starting from the apex 25, the bearing surface 20 can have a diameter decrease towards a second front end 27 of the slide bearing pad 18. In the region of the second front end 27, the bearing surface 20 can have a second diameter 28.

In particular, it can be provided that a spherical cap section 29 is configured between the first front end 23 and the apex 25. The spherical cap section 29 can have the basic form of a spherical cap with a spherical cap radius 30.

It can further be provided that the apex 25 is arranged at a distance 33 from a second front end 27 of the slide bearing pad 18. The slide bearing pad 18 can have an axial extension 34.

FIG. 4 shows the first exemplary embodiment of the slide bearing arrangement 9 in a perspective sectional representation, wherein the same reference numbers and/or the same component designations as in the preceding FIGS. 1 to 3 are used again. To avoid unnecessary repetitions, the detailed description in the preceding FIGS. 1 to 3 should be noted and/or is referred to.

As can further be seen from FIG. 4, it can be provided that a cover 36 is arranged on an axial front end 35 of the bearing block 17. The cover 36 serves to close up the interior of the bearing block 17.

As can further be seen from FIG. 4, it can be provided that a lubricating oil reservoir 37 is adjoined to the cover 36, which lubricating oil reservoir 37 serves to receive lubricating oil 38. In particular, it can be provided here that a pass-through opening 39 is configured in the cover 36, through which the lubricating oil 38 from the lubricating oil reservoir 37 can flow into the interior of the bearing block 17.

FIG. 5 shows a perspective sectional representation of the slide bearing arrangement 9, wherein the same reference numbers and/or the same component designations as in the preceding FIGS. 1 to 4 are used again. To avoid unnecessary repetitions, the detailed description in the preceding FIGS. 1 to 4 should be noted and/or is referred to.

In FIG. 5, the cover 36 and the lubricating oil reservoir 37 are blanked out for better clarity. Therefore, the interior components of the slide bearing 9 are visible.

As can be seen from FIG. 5, it can be provided that a removal opening 41 is configured in the outer ring element 14, which removal opening 41 serves to axially remove individual of the slide bearing pads 18.

FIG. 6 shows a perspective view of the outer ring element 14, wherein the same reference numbers and/or the same component designations as in the preceding FIGS. 1 to 5 are used again. To avoid unnecessary repetitions, the detailed description in the preceding FIGS. 1 to 5 should be noted and/or is referred to.

In FIG. 6, the removal opening 41 is visible particularly clearly.

As can be seen from FIGS. 5 and 6, it can be provided that the removal opening 41 interrupts, at least in sections, the mating surface 21 configured in the outer ring element 14. In particular, it can be provided that the removal opening 41 extends starting from a first front end 42 of the outer ring element 14. In particular, it can be provided that the removal opening 41 does not extend up to a second front end 43 of the outer ring element 14. Rather, the removal opening 41 may extend only up to the apex 25.

As can be seen particularly readily from a combination of FIGS. 3 and 6, it can be provided that the removal opening 41 is configured so as to widen radially towards the first front end 42. In particular, it can be provided here that a first removal opening region 45 and a second removal opening region 46 are configured, each of which have a different radial widening. It can further be provided that the second removal opening region 46, which is arranged closer to the first front end 42 of the outer ring element 14, has a larger radial widening than the first removal opening region 45.

In another exemplary embodiment, which is not represented, it can also be provided, of course, that the removal opening 41 completely penetrates the outer ring element 14 radially.

FIG. 7 shows the rotor shaft 16 with the slide bearing pads 18 arranged thereupon in a perspective view, wherein the same reference numbers and/or the same component designations as in the preceding FIGS. 1 to 6 are used again. To avoid unnecessary repetitions, the detailed description in the preceding FIGS. 1 to 6 should be noted and/or is referred to.

As can be seen from a combination of FIGS. 6 and 7, it can be provided that the removal opening 41 has a circumferential extension 47. The individual slide bearing pads 18 can have a circumferential extension 48.

As can be seen particularly readily from FIG. 5, it can be provided that a shaft nut 49 is configured, which can be screwed onto the rotor shaft 16. On the shaft nut 49, an axial securing element reception 50 can be configured, which serves to receive individual axial securing elements 51. In particular, it can be provided that the axial securing element reception 50 comprises a tapped hole, wherein the individual axial securing elements 51 can be screwed into the tapped hole in a radial direction by means of a fastening screw 52.

It can further be provided that the axial securing elements 51 have a wedge surface 54 on an axial front end 53. On the first front end 23 of the slide bearing pad 18, a first mating wedge surface 55 can be configured. In particular, it can be provided that the wedge surface 54 interacts with and/or rests against the first mating wedge surface 55.

As can further be seen from FIG. 5, it can be provided that an axial stop ring 56 is configured, which, together with the axial securing element 51, serves to clamp the slide bearing pad 18. In particular, the individual slide bearing pads 18 can be clamped between the axial stop ring 56 and the axial securing element 51 and/or between multiple axial securing elements 51.

As can be seen from FIG. 5, it can be provided that the axial stop ring 56 has a wedge surface 57, which is configured such that an interlocking bond between the slide bearing pad 18 and the axial stop ring 56 can be achieved.

As can further be seen from FIG. 5, it can be provided that the bearing block 17 has an axial stop 62 for the outer ring element 14. It can further be provided that a recess 63 is configured in the axial stop 62, which recess 63 corresponds with the removal opening 41.

In the assembled state of the slide bearing arrangement 9, the outer ring element 14 is received in the bearing block 17.

The axial stop ring 56 can be affixed to the rotor shaft 16. Further, the shaft nut 49 can be screwed onto the rotor shaft 16. As can be seen from FIG. 5, individual slide bearing pads 18 can be clamped between the axial stop ring 56 and at least one axial securing element 51 each.

Due to the shape of the axial stop ring 56 and/or of the axial securing element 51, the slide bearing pads 18 can be coupled with the rotor shaft 16 so as to be clamped in an interlocking manner both in an axial direction and in a radial direction.

To change the individual slide bearing pads 18, the cover 36 can be removed from the bearing block 17. Alternatively, it is also conceivable that a maintenance opening is configured in the cover 36, which maintenance opening can be uncoupled from the cover 36, whereby the interior of the bearing block 17 is accessible.

In another alternative, it is also conceivable that the cover 36 is configured so as to be divided, so that it can be removed radially from the rotor shaft 16 and need not be displaced along the rotor shaft 16 in an axial direction. Here, the cover 36 can be configured so as to be divided in a center plane, for example.

FIGS. 8 to 11 show another, third embodiment of the slide bearing arrangement 9 that is optionally independent in itself, wherein the same reference numbers and/or the same component designations as in the preceding FIGS. 1 to 9 are used again. To avoid unnecessary repetitions, the detailed description in the preceding FIGS. 1 to 9 should be noted and/or is referred to.

As can be seen from FIG. 9, it can be provided that the rotor shaft 16 has a rotor shaft flange 71, which can serve to flange the rotor hub 6.

As can be seen from FIG. 10, it can be provided that spacers 73 are configured on the individual slide bearing pads 18. The spacers 73 serve to correctly space the individual slide bearing pads 18 in relation to one another in a circumferential direction. In particular, it can be provided that, on at least one of the circumferential faces 74 of the slide bearing pad 18, the spacers 73 are configured exclusively in the region of the inner face 72 and do not extend across the complete height of the slide bearing pads 18. It can further be provided that the spacers 73 are configured on both circumferential faces 74 of the slide bearing pad 18.

As can be seen particularly readily from FIG. 11, it can be provided that a filler element 80 is configured, which serves to be inserted in the removal opening 41 of the outer ring element 14. In the inserted state, the filler element 80 can complete, or at least partially complete, the mating surface 21. This results in improved sliding properties.

It can further be provided that the filler element 80 can be coupled with the outer ring element 14 by means of an interlocking bond 81, in particular by means of a connecting groove. It can further be provided that the filler element 80 is secured in its position by means of a securing element, which is not represented.

FIGS. 12 to 14 show a detailed view of the slide bearing pad 18 from the third exemplary embodiment of the slide bearing arrangement 9 in different perspective representations, wherein the same reference numbers and/or the same component designations as in the preceding FIGS. 1 to 11 are used again. To avoid unnecessary repetitions, the detailed description in the preceding FIGS. 1 to 11 should be noted and/or is referred to.

As can be seen particularly readily from FIG. 14, it can be provided that a reception 70 for producing an interlocking bond with a lifting device is configured on the inner face 72 of the slide bearing pad 18.

As can be seen from FIG. 14, it can be provided that a form element 69, in particular a tapped hole, is configured on the first front end 23 of the slide bearing pad 18, which form element 69 serves to receive a connection element. By means of the form element 69, the slide bearing pad 18 can be coupled with a slide bearing pad changing device.

Based on FIGS. 15 to 23, an assembly of the rotor bearing arrangement 8 and/or a rotor bearing arrangement assembling device 83 for assembling the rotor bearing arrangement 8 is described, wherein the same reference numbers and/or the same component designations as in the respectively preceding figures are used again. To avoid unnecessary repetitions, the detailed description in the respectively preceding figures should be noted and/or is referred to.

As can be seen from FIG. 15, it can be provided that the rotor bearing arrangement assembling device 83 has a rotor shaft support 84 for receiving the rotor shaft 16. Further, a receiving device 85 can be configured, which serves to receive the bearing block 17. The receiving device can have a receiving carriage 86, which can be received on a linear guide 87 so as to be displaceable. The linear guide 87 can be arranged on a base frame 88. It can further be provided that the base frame 88 is coupled with a base 90 directly or by means of another linear guide 89. The base 90 can equally serve to receive the rotor shaft support 84.

It can further be provided that the base frame 88 is arranged on the base 90 by means of the other linear guide 89 so as to be displaceable relative to the base 90. This measure enables a faulty positioning of the rotor shaft 16 on the rotor shaft support 84 to be equalized in a first direction. Further, it is conceivable that the rotor shaft support 84 is arranged on the base 90 by means of a rotor shaft support linear guide so as to be displaceable. Here, the rotor shaft support linear guide can be aligned such that it is arranged at a right angle to the other linear guide 89. This enables a faulty position of the rotor shaft 16 relative to the rotor shaft support 84 to be equalized also in the second direction.

In an alternative embodiment variant, it is also conceivable that the rotor shaft support 84 is displaceable relative to the base 90 by means of a cross slide, and therefore the rotor shaft 16 can be freely positioned for the assembly. In particular, it can be provided here that the rotor shaft 16 can be displaced manually.

During the initial assembly of the rotor bearing arrangement 8, in a first step in accordance with the representation according to FIG. 15, the rotor shaft 16 can be positioned and/or installed on the rotor shaft support 84 with its rotor shaft flange 71 facing downward.

In another method step in accordance with FIG. 16, it can be provided that the axial stop ring 56 is placed upon the rotor shaft 16.

In parallel to this, the bearing block 17 can be fitted with slide bearing pads 18, as can be seen from FIGS. 17 to 19. In particular, it can be provided that the outer ring element 14 is inserted in the bearing block 17 and the individual slide bearing pads 18 are subsequently inserted in the outer ring element 14.

To insert the individual slide bearing pads 18 in the outer ring element 14, a lifting device 92 can be configured, which can form an interlocking bond with the receptions 70 for the lifting device 92, whereby the slide bearing pads 18 can be lifted and/or positioned by means of the lifting device 92.

As can be seen particularly readily from FIG. 17, it can be provided that the bearing block 17 is rested on the ground, so that the axis of rotation 19 of the bearing block 17 is arranged vertically. Subsequently, the individual slide bearing pads 18 can be lifted into the region of the outer ring element 14 from above in an axial direction of the bearing block 17 by means of the lifting device 92, which can be coupled with a crane. When the slide bearing pad 18 is correctly positioned in an axial direction, the slide bearing pad 18 can subsequently be displaced radially outward in a radial direction until the bearing surface 20 is in contact with the mating surface 21.

Subsequently, the slide bearing pad 18 just inserted can be secured in its position by means of a connector 93, as can be seen from FIG. 18. In particular, it is conceivable here that the connector 93 is screwed to the outer ring element 14 by means of a first connection element, in particular by means of a screw, and is screwed to the interlocking bond 81 of the slide bearing pad 18 by means of a second connection element, in particular by means of a screw.

As can further be seen from FIG. 18, it can additionally be provided that an alignment piece 119 is positioned in the region of the second front end 43 of the outer ring element 14. Of course, multiple alignment pieces 119, in particular three alignment pieces 119, can be positioned on the outer ring element 14 so as to be distributed across the circumference. The alignment piece 119 can additionally facilitate the jointing of the rotor shaft 16 and of the outer ring element 14, as a centering can be done by means of the alignment piece 119. It can further be provided that the alignment piece 119 has a conical shape. In other words, the alignment piece 119 can have a cross section that widens in an axial direction, wherein the cone is configured so as to open up outwardly, so that the cross section is larger on the exterior. After the axial jointing of the rotor shaft 16 and of the outer ring element 14, which jointing will be described in detail below, the alignment piece 119 can be removed again.

This scheme can be used to insert the majority of the individual slide bearing pads 18 in the bearing block 17. Only the last of the slide bearing pads 18 cannot be inserted in the bearing block 17 in the manner described but must be inserted in the bearing block 17 and/or in the outer ring element 14 exclusively by axial displacement in the region of the removal opening 41. The bearing block 17 with all integrated slide bearing pads 18, which are retained in their position by means of the connectors 93, is represented in FIG. 19.

Parallel to this, or in a subsequent method step, a rotor shaft protection 91, in particular a first rotor shaft protection part 94, can be slipped onto the rotor shaft 16.

In another method step in accordance with FIG. 21, a second rotor shaft protection part 95 can be slipped onto the rotor shaft 16. Here, the second rotor shaft protection part 95 can be centered on the first rotor shaft protection part 94 in an interlocking manner.

In another method step in accordance with FIG. 22, a third rotor shaft protection part 96 can be slipped onto the rotor shaft 16, wherein the third rotor shaft protection part 96 can equally engage with the second rotor shaft protection part 95 in an interlocking manner, so that the second rotor shaft protection part 95 is centered by the third rotor shaft protection part 96.

In another method step, which is represented in FIG. 23, the bearing block 17 provided with the individual slide bearing pads 18 can be tensioned and/or received on the receiving device 85.

Subsequently, the bearing block 17 can be slipped onto the rotor shaft 16 axially until the rotor shaft 16 has reached its insertion position, as represented in FIG. 24.

In a subsequent method step, the rotor shaft protection 91 can be removed, and the individual slide bearing pads 18 can be fixed in their position on the rotor shaft 16 by means of the axial securing elements 51.

In a subsequent method step, the connectors 93 can be removed, so that the rotor shaft 16 is received in the bearing block 17 so as to be rotatable. Subsequently, the cover 36 can be mounted on the bearing block 17.

In a subsequent method step, the bearing block 17 can be integrated in the nacelle 2 of the wind turbine 1 together with the rotor shaft 16. Here, it is conceivable in a first embodiment that the nacelle 2, in particular the nacelle housing 4, is affixed directly to the tower 3 and the bearing block 17 is inserted in the nacelle housing 4 along with the rotor shaft 16.

Alternatively, it is also conceivable that the bearing block 17, along with the rotor shaft 16, is inserted in a nacelle housing 4 that is still on the ground and that the readily completed nacelle 2 is subsequently lifted onto the tower 3 of the wind turbine 1.

FIGS. 24 and 25 show another, fourth embodiment of the slide bearing arrangement 9 that is optionally independent in itself, wherein the same reference numbers and/or the same component designations as in the preceding FIGS. 1 to 23 are used again. To avoid unnecessary repetitions, the detailed description in the preceding FIGS. 1 to 23 should be noted and/or is referred to.

For the sake of simplicity, only a single slide bearing pad 18 is represented in FIGS. 24 and 25, wherein, however, also multiple of the slide bearing pads 18 can be arranged so as to be distributed evenly across the circumference, just like in the preceding exemplary embodiments.

As can be seen from FIG. 25, it can be provided that a slide bearing pad reception ring 110 is arranged on the inner ring element 13, which slide bearing pad reception ring 110 serves to receive the individual slide bearing pads 18.

In particular, it can be provided that the individual slide bearing pads 18 have a shoulder 114 on their inner face 72. The shoulder 114 can form a contact surface, so that the slide bearing pad 18 can rest against a first front end 115 of the slide bearing pad reception ring 110 in the region of the shoulder 114. This ensures that the slide bearing pad 18 can be positioned relative to the slide bearing pad reception ring 110 in an axial direction.

It can further be provided that the shoulder 114 bounds a recess 116, which is configured on the inner face 72 of the slide bearing pad 18. The recess 116 can extend up to the shoulder 114 starting from the second front end 27 of the slide bearing pad 18. The recess 116 and/or the shoulder 114 can be configured so as to be rotationally symmetric.

In particular, it can be provided that, in the integrated state of the slide bearing pad 18, the slide bearing pad reception ring 110 is at least partially received in the recess 116 of the slide bearing pad 18.

It can further be provided that multiple tapped holes 111 are configured on the first front end 115 of the slide bearing pad reception ring 110. Corresponding with the tapped holes 111, one, in particular multiple, pass-through holes 112 can be configured in each of the slide bearing pads 18.

Further, fastening screws 113 can be guided through the pass-through holes 112, which fastening screws 113 can be screwed into the tapped holes 111 and can therefore serve to affix the slide bearing pads 18 to the slide bearing pad reception ring 110.

As can further be seen from FIG. 25, it can be provided that a second front end 117 of the slide bearing pad reception ring 110 rests against a shaft bead 118. This enables the slide bearing pad reception ring 110 to be positioned axially on the inner ring element 13.

In the exemplary embodiment of the slide bearing arrangement 9 in accordance with FIGS. 24 and 25, the described method for assembling the slide bearing arrangement 9 is modified as follows.

In the method step according to FIG. 16, instead of the axial stop ring 56, the slide bearing pad reception ring 110 is slipped and/or forced onto the rotor shaft 16 axially.

Also the method step for fixing the individual slide bearing pads 18 by means of the axial securing elements 51 will be obsolete. Instead, the individual slide bearing pads 18 can be pressed against the slide bearing pad reception ring 110 axially and/or be affixed to the slide bearing pad reception ring 110 axially by means of the fastening screws 113.

It can further be provided that, to slip the bearing block 17 axially onto the rotor shaft 16, a guide pin can be screwed into at least one of the tapped holes 111, so that an angular alignment of the bearing block 17 relative to the rotor shaft 16 can be done, so that the tapped holes 111 of the slide bearing pad reception ring 110 and the pass-through holes 112 of the slide bearing pads 18 can be aligned coaxially with one another during the jointing. In a subsequent method step, the guide pin can be removed from the tapped hole 111 and be replaced by one of the fastening screws 113.

FIG. 26 shows an alternative embodiment variant with respect to the assembling step according to FIG. 19. As can be seen from FIG. 26, it can be provided that a connection ring 120 is provided, by means of which the slide bearing pads 18 can be temporarily coupled with the outer ring element 14 and/or can be temporarily held in the outer ring element 14. In particular, it can be provided that the slide bearing pads 18, in accordance with the description according to FIG. 18, can be inserted individually in the outer ring element 14 and, after being inserted, can each be held in position individually on the outer ring element 14 by means of the connection ring 120 in order to enable the jointing of the rotor shaft 16 and of the outer ring element 14.

Here, it can be provided that the individual slide bearing pads 18 are inserted in the outer ring element 14 in succession, wherein the individual slide bearing pads 18 are positioned below the connection ring 120 in an axial direction and are subsequently displaced radially outward. Here, it can be provided that the outer ring element 14 with the slide bearing pads 18 inserted therein is jointed with the rotor shaft 16 axially, as described above. Subsequently, the connection ring 120, which holds the slide bearing pads 18 in position temporarily, can be removed.

It can further be provided that not all of the slide bearing pads 18 are inserted in the outer ring element 14, but that one of the slide bearing pads 18 is not inserted in the outer ring element 14. This may be necessary because it can happen that, due to the limited space, the last of the slide bearing pads 18 cannot be inserted radially in the existing gap. Here, it can be provided that the outer ring element 14 with the slide bearing pads 18 inserted therein, wherein one slide bearing pad 18 is missing, is jointed with the rotor shaft 16 axially, as described above. Subsequently, the connection ring 120, which holds the slide bearing pads 18 in position temporarily, can be removed. Subsequently, the individual slide bearing pads 18 can be screwed to the slide bearing pad reception ring 110. Subsequently, the last of the slide bearing pads 18 can be inserted in the bearing block 17 and/or the outer ring element 14 through the removal opening 41 and equally be screwed to the slide bearing pad reception ring 110.

For transport safety, a ring holder 121 can be coupled with the bearing block 17, wherein the ring holder 121 can equally be coupled with one of the slide bearing pads 18, which, in turn, is coupled with the rotor shaft 16. Therefore, the rotor shaft 16 can be secured in its position relative to the bearing block 17 by means of the ring holder 121 in order to enable prevention of damage to the sliding surfaces, for example, during transport. In particular, it can be provided that multiple, preferably four, of the ring holders 121 are arranged so as to be distributed across the circumference.

It can further be provided that the connection ring 120 is held in position by means of the ring holder 121 already when inserting the slide bearing pads 18. The ring holder 121 can be coupled with the bearing block 17 and with the connection ring 120. In particular, it can be provided that two ring holders 121, arranged so as to be distributed across the circumference and opposite each other, are used for affixing the connection ring 120.

It can further be provided that a spacer element is arranged between the ring holder 121 and the bearing block 17, which spacer element has the same thickness as the connection ring 120. This measure enables the ring holder 121 to be screwed to the bearing block 17 and directly to the slide bearing pads 18, this time without a spacer element, after the connection ring 120 has been removed in order to enable the rotor shaft 16 to be fixed relative to the bearing block 17.

The exemplary embodiments show possible embodiment variants, wherein it should be noted in this respect that the invention is not restricted to these particular illustrated embodiment variants of it, but that rather also various combinations of the individual embodiment variants are possible and that this possibility of variation owing to the teaching for technical action provided by the present invention lies within the ability of the person skilled in the art in this technical field.

The scope of protection is determined by the claims. However, the description and the drawings are to be adduced for construing the claims. Individual features or feature combinations from the different exemplary embodiments shown and described may represent independent inventive solutions. The object underlying the independent inventive solutions may be gathered from the description.

Any and all specifications of value ranges in the description at issue are to be understood to comprise any and all sub-ranges of same, for example the specification 1 to 10 is to be understood to mean that any and all sub-ranges starting from the lower limit 1 and from the upper limit 10 are comprised therein, i.e. any and all sub-ranges start at a lower limit of 1 or larger and end at on upper limit of 10 or less, e.g. 1 to 1.7, or 3.2 to 8.1, or 5.5 to 10.

Finally, as a matter of form, it should be noted that for ease of understanding of the structure, elements are partially not depicted to scale and/or are enlarged and/or are reduced in size.

List of reference numbers 1 wind turbine
2 nacelle
3 tower
4 nacelle housing
5 rotor List of reference numbers
-continued 6 rotor hub
7 rotor blade
8 rotor bearing arrangement
9 slide bearing arrangement
10 radial force
11 axial force
12 tilting moment
13 inner ring element
14 outer ring element
15 slide bearing element
16 rotor shaft
17 bearing block
18 slide bearing pad
19 axis of rotation
20 bearing surface
21 mating surface
22 inner face
23 first front end
24 first diameter
25 apex
26 diameter at apex
27 second front end
28 second diameter
29 spherical cap section
30 spherical cap radius
31
32
33 distance
34 axial extension of slide bearing pad
35 axial front end of bearing block
36 cover
37 lubricating oil reservoir
38 lubricating oil
39 pass-through opening
40
41 removal opening
42 first front end of outer ring element
43 second front end of outer ring element
44
45 first removal opening region
46 second removal opening region
47 circumferential extension of removal opening
48 circumferential extension of slide bearing pad
49 shaft nut
50 axial securing element reception
51 axial securing element
52 fastening screw
53 axial front end of axial securing element
54 wedge surface of axial securing element
55 first mating wedge surface
56 axial stop ring
57 wedge surface of axial stop ring
58
59
60
61
62 axial stop
63 recess
64
65
66
67
68 thrust ring segment
69 form element of slide bearing pad
70 reception for lifting device
71 rotor shaft flange
72 inner face
73 spacer
74 circumferential face
75 lubricating oil transport groove
76 second mating wedge surface
77
78
79
80 filler element
81 interlocking bond
82

List of reference numbers

| | |
|---|---|
| 83 | rotor bearing arrangement assembling device |
| 84 | rotor shaft support |
| 85 | receiving device |
| 86 | receiving carriage |
| 87 | linear guide of receiving carriage |
| 88 | base frame |
| 89 | other linear guide |
| 90 | base |
| 91 | rotor shaft protection |
| 92 | lifting device |
| 93 | connector |
| 94 | first rotor shaft protection part |
| 95 | second rotor shaft protection part |
| 96 | third rotor shaft protection part |
| 97 | |
| 98 | |
| 99 | |
| 100 | |
| 101 | |
| 102 | |
| 103 | |
| 104 | |
| 105 | |
| 106 | |
| 107 | |
| 108 | |
| 109 | |
| 110 | slide bearing pad reception ring |
| 111 | tapped hole |
| 112 | pass-through hole |
| 113 | fastening screw |
| 114 | shoulder |
| 115 | first front end of slide bearing pad reception ring |
| 116 | recess |
| 117 | second front end of slide bearing pad reception ring |
| 118 | shaft bead |
| 119 | alignment piece |
| 120 | connection ring |
| 121 | ring holder |

The invention claimed is:

1. A method for assembling a rotor bearing arrangement of a wind turbine, comprising the method steps:
    providing a rotor shaft;
    providing a bearing block;
    providing individual slide bearing pads;
    inserting the slide bearing pads in the bearing block; and
    joining the rotor shaft and the bearing block fitted with the slide bearing pads;
        wherein, during the joining of the rotor shaft and the bearing block fitted with the slide bearing pads, the rotor shaft is installed on a rotor shaft support so as to be vertically upright, wherein a rotor shaft flange of the rotor shaft rests on the rotor shaft support and wherein the bearing block fitted with the slide bearing pads is placed upon the rotor shaft vertically from above;
        wherein the bearing block is received on a receiving carriage of a receiving device and is guided by means of the receiving carriage, and wherein the receiving carriage is received on the receiving device by means of a linear guide so as to be displaceable in a vertical direction.

2. The method according to claim 1, wherein, prior to the joining of the rotor shaft and of the bearing block fitted with the slide bearing pads, a slide bearing pad reception ring is received on the rotor shaft, wherein the slide bearing pad reception ring serves to affix the slide bearing pads.

3. The method according to claim 1, wherein, prior to the joining of the rotor shaft and of the bearing block fitted with the slide bearing pads, a rotor shaft protection in a form of a sleeve is arranged on the rotor shaft, wherein the rotor shaft protection covers parts of the rotor shaft over which the bearing block fitted with the slide bearing pads is moved during transfer to a respective seat of the slide bearing pads.

4. The method according to claim 1, wherein, when inserting the slide bearing pads in the bearing block, the slide bearing pads are individually placed in the bearing block, wherein the slide bearing pads have a reception on a respective inner face for connecting the slide bearing pads with a lifting device.

5. The method according to claim 4, wherein, when inserting the slide bearing pads in the bearing block, at least one slide bearing pad of the slide bearing pads is moved radially outward in order to bring the at least one slide bearing pad into contact with a mating surface.

6. The method according to claim 4, wherein, each time after placing one of the slide bearing pads in the bearing block, the one slide bearing pad just placed in the bearing block is affixed to the bearing block by means of a connector having at least one screw.

7. The method according to claim 6, wherein, after the joining of the rotor shaft and of the bearing block fitted with the slide bearing pads, the connector having at least one screw is removed, and the one slide bearing pad is subsequently affixed to a slide bearing pad reception ring.

8. The method according to claim 4, wherein a last of the slide bearing pads which is placed in the bearing block is inserted in the bearing block in an axial direction through a removal opening.

9. The method according to claim 1, wherein the assembly of the rotor bearing arrangement is done remote from a nacelle of a wind turbine and wherein, in a subsequent method step, the readily assembled rotor bearing arrangement is lifted onto the nacelle of the wind turbine by means of a crane and is affixed to the nacelle of the wind turbine.

10. The method according to claim 1, wherein the individual slide bearing pads are inserted in an outer ring element in succession, wherein the individual slide bearing pads are positioned below a connection ring in an axial direction and are subsequently displaced radially outward into a displaced position and are subsequently coupled with the connection ring, wherein the connection ring serves to hold the slide bearing pads in the displaced position temporarily.

* * * * *